United States Patent
Benjey et al.

(10) Patent No.: US 10,934,951 B2
(45) Date of Patent: Mar. 2, 2021

(54) ADAPTIVE STATE OF CHARGE REGULATION AND CONTROL OF VARIABLE SPEED HYBRID ELECTRIC SUPERCHARGER ASSEMBLY FOR EFFICIENT VEHICLE OPERATION

(71) Applicant: Eaton Intelligent Power Limited, Dublin (IE)

(72) Inventors: Robert Philip Benjey, Dexter, MI (US); Vasilios Tsourapas, Northvill, MI (US)

(73) Assignee: Eaton Intelligent Power Limited, Dublin (IE)

( * ) Notice: Subject to any disclaimer, the term of this patent is extended or adjusted under 35 U.S.C. 154(b) by 209 days.

(21) Appl. No.: 16/159,215

(22) Filed: Oct. 12, 2018

(65) Prior Publication Data
US 2019/0040808 A1 Feb. 7, 2019

Related U.S. Application Data

(60) Division of application No. 14/849,095, filed on Sep. 9, 2015, now Pat. No. 10,125,698, which is a (Continued)

(51) Int. Cl.
*F02D 41/00* (2006.01)
*B60K 6/24* (2007.10)
(Continued)

(52) U.S. Cl.
CPC ............ *F02D 41/0007* (2013.01); *B60K 6/24* (2013.01); *B60K 6/485* (2013.01); *B60W 10/06* (2013.01);
(Continued)

(58) Field of Classification Search
CPC .......... F02D 41/0007; F02D 2200/503; B60W 20/13; B60W 20/19; B60W 10/06;
(Continued)

(56) References Cited

U.S. PATENT DOCUMENTS

| 1,752,224 A | 3/1930 | Apple |
| 1,878,210 A | 9/1932 | Vincent |

(Continued)

FOREIGN PATENT DOCUMENTS

| CN | 1982670 A | 6/2007 |
| CN | 101326068 A | 12/2008 |

(Continued)

OTHER PUBLICATIONS

International Search Report for corresponding International Patent Application No. PCT/US2014/024898 dated Jul. 24, 2014.
(Continued)

*Primary Examiner* — Michael V Kerrigan
(74) *Attorney, Agent, or Firm* — Merchant & Gould P.C.

(57) ABSTRACT

A variable speed hybrid electric supercharger assembly is controlled to regulate an adaptive state of charge of an energy storage device and/or to boost an engine based on a performance mode selected by a driver. In one example, a reference state of charge is determined based upon driving characteristics of a vehicle and compared to an actual state of charge of the energy storage device. If the difference indicates a deficit, an operation mode is selected to regenerate the energy storage device. In another example, a planetary gearing arrangement between an engine and an electric motor is configured to increase or decrease power transferred to the supercharger by the engine based upon the performance mode selected by the driver.

20 Claims, 30 Drawing Sheets

Related U.S. Application Data continuation of application No. PCT/US2014/024898, filed on Mar. 12, 2014.

(60) Provisional application No. 61/861,111, filed on Aug. 1, 2013, provisional application No. 61/776,837, filed on Mar. 12, 2013, provisional application No. 61/776,834, filed on Mar. 12, 2013.

(51) Int. Cl.
| | |
|---|---|
| *B60K 6/485* | (2007.10) |
| *F02B 33/38* | (2006.01) |
| *F02B 39/06* | (2006.01) |
| *F02B 39/12* | (2006.01) |
| *F02B 39/10* | (2006.01) |
| *B60W 20/13* | (2016.01) |
| *B60W 20/19* | (2016.01) |
| *B60W 10/06* | (2006.01) |
| *B60W 10/26* | (2006.01) |
| *B60W 40/04* | (2006.01) |
| *B60W 40/06* | (2012.01) |
| *B60W 40/09* | (2012.01) |

(52) U.S. Cl.
CPC ............ *B60W 10/26* (2013.01); *B60W 20/13* (2016.01); *B60W 20/19* (2016.01); *B60W 40/04* (2013.01); *B60W 40/06* (2013.01); *B60W 40/09* (2013.01); *F02B 33/38* (2013.01); *F02B 39/06* (2013.01); *F02B 39/10* (2013.01); *F02B 39/12* (2013.01); *B60W 2510/0633* (2013.01); *B60W 2510/244* (2013.01); *B60W 2710/0638* (2013.01); *B60W 2710/244* (2013.01); *B60Y 2400/435* (2013.01); *F02D 2200/503* (2013.01); *Y02T 10/12* (2013.01); *Y02T 10/62* (2013.01); *Y10S 903/905* (2013.01)

(58) Field of Classification Search
CPC ...... B60W 10/26; B60W 40/04; B60W 40/06; B60W 40/09; B60W 2710/0638; B60W 2710/244; B60W 2510/0633; B60W 2510/244; F02B 33/38; F02B 39/06; F02B 39/12; F02B 39/10; B60K 6/24; B60K 6/485; Y02T 10/6295; Y02T 10/6226; Y02T 10/144; Y02T 10/12; Y02T 10/62; Y10S 903/905; B60Y 2400/435

See application file for complete search history.

(56) References Cited

U.S. PATENT DOCUMENTS

| | | | |
|---|---|---|---|
| 2,358,815 A | 9/1944 | Lysholm | |
| 2,390,487 A | 12/1945 | Lawrence et al. | |
| 2,400,306 A | 5/1946 | Hobbs | |
| 2,402,547 A | 6/1946 | Gilfillan | |
| 2,441,779 A | 5/1948 | Troeger et al. | |
| 2,467,077 A | 4/1949 | Brunken | |
| 2,965,083 A | 12/1960 | Percival | |
| 2,975,963 A | 3/1961 | Nilsson | |
| 3,180,079 A | 4/1965 | Freeman, Jr. | |
| 3,184,155 A | 5/1965 | Crooks | |
| 3,391,584 A | 7/1968 | Glamann | |
| 3,430,517 A | 3/1969 | Glamann | |
| 3,603,853 A | 9/1971 | Mackay | |
| 3,676,999 A | 7/1972 | Oldfield | |
| 3,741,676 A | 6/1973 | Silvern et al. | |
| 3,804,565 A | 4/1974 | Sennet et al. | |
| 3,868,822 A | 3/1975 | Keller | |
| 3,958,419 A | 5/1976 | Laing | |
| 3,976,390 A | 8/1976 | Silvern et al. | |
| 4,068,984 A | 1/1978 | Spindler | |
| 4,083,188 A | 4/1978 | Kumm | |
| 4,478,043 A | 10/1984 | Kobayashi et al. | |
| 4,485,310 A | 11/1984 | de Valroger | |
| 4,489,242 A | 12/1984 | Worst | |
| 4,729,225 A | 3/1988 | Bucher | |
| 4,730,457 A | 3/1988 | Yamada et al. | |
| 4,825,839 A | 5/1989 | Mehnert | |
| 5,115,788 A | 5/1992 | Sasaki et al. | |
| 5,121,607 A | 6/1992 | George, Jr. | |
| 5,125,806 A | 6/1992 | Quick et al. | |
| 5,158,427 A | 10/1992 | Shirai | |
| 5,195,881 A | 3/1993 | George, Jr. | |
| 5,241,817 A | 9/1993 | George, Jr. | |
| 5,263,832 A | 11/1993 | Yamaguchi | |
| 5,394,848 A | 3/1995 | Tsutsumi et al. | |
| 5,442,918 A | 8/1995 | Baeuerle et al. | |
| 5,713,204 A | 2/1998 | Kadlicko | |
| 5,791,315 A | 8/1998 | Riach et al. | |
| 5,875,766 A | 3/1999 | Ozawa | |
| 5,887,434 A | 3/1999 | Arnell et al. | |
| 5,890,468 A | 4/1999 | Ozawa | |
| 5,910,001 A | 6/1999 | Takahashi et al. | |
| 6,048,288 A | 4/2000 | Tsujii et al. | |
| 6,537,169 B1 | 3/2003 | Morii | |
| 6,631,702 B2 | 10/2003 | Tonnqvist et al. | |
| 6,637,203 B2 | 10/2003 | Berglund | |
| 6,666,194 B2 | 12/2003 | Wildner | |
| 6,684,863 B2 | 2/2004 | Dixon et al. | |
| 6,817,349 B2 | 11/2004 | Awasaka et al. | |
| 6,845,832 B2 | 1/2005 | Takizawa et al. | |
| 6,863,139 B2 | 3/2005 | Egami et al. | |
| 6,907,867 B2 | 6/2005 | Igarashi et al. | |
| 6,918,250 B2 | 7/2005 | Baeuerle | |
| 6,922,995 B2 | 8/2005 | Kawamura et al. | |
| 6,938,419 B2 | 9/2005 | Okuyama et al. | |
| 7,000,601 B2 | 2/2006 | Yasui et al. | |
| 7,102,304 B2 | 9/2006 | Sebille et al. | |
| 7,524,263 B2 | 4/2009 | Johnson et al. | |
| 7,708,283 B2 | 5/2010 | Azibert et al. | |
| 7,748,366 B2 | 7/2010 | Rollinger et al. | |
| 7,765,806 B2 | 8/2010 | Clark | |
| 7,805,937 B2 | 10/2010 | Cochet et al. | |
| 8,087,401 B2 | 1/2012 | Inoue et al. | |
| 8,151,773 B2 | 4/2012 | Prior | |
| 8,196,686 B2 | 6/2012 | Grieve | |
| 8,808,124 B2 | 8/2014 | Major et al. | |
| 9,074,524 B2 | 7/2015 | Eybergen et al. | |
| 9,534,531 B2 | 1/2017 | Benjey et al. | |
| 9,534,532 B2 | 1/2017 | Eybergen et al. | |
| 9,751,411 B2 | 9/2017 | Benjey et al. | |
| 9,856,781 B2 | 1/2018 | Tsourapas et al. | |
| 10,125,698 B2 | 11/2018 | Benjey et al. | |
| 2001/0039230 A1 | 11/2001 | Severinsky et al. | |
| 2004/0178636 A1 | 9/2004 | Iwanami et al. | |
| 2004/0237949 A1* | 12/2004 | Yasui ............... F04D 25/024 123/559.1 |
| 2006/0157036 A1 | 7/2006 | Andersen | |
| 2006/0260304 A1 | 11/2006 | Ishiwatari | |
| 2006/0270519 A1 | 11/2006 | Kamada et al. | |
| 2007/0051349 A1 | 3/2007 | Marumoto et al. | |
| 2007/0074701 A1 | 4/2007 | Mizutani | |
| 2007/0137626 A1 | 6/2007 | Turner | |
| 2008/0041323 A1 | 2/2008 | Clark | |
| 2008/0087482 A1 | 4/2008 | Ledger et al. | |
| 2008/0173017 A1 | 7/2008 | St. James | |
| 2008/0194375 A1 | 8/2008 | Voigt et al. | |
| 2008/0219866 A1 | 9/2008 | Kwong et al. | |
| 2008/0289610 A1 | 11/2008 | Nguyen-Schaefer et al. | |
| 2008/0312803 A1 | 12/2008 | Igarashi et al. | |
| 2009/0019852 A1 | 1/2009 | Inoue et al. | |
| 2009/0038585 A1 | 2/2009 | Andri | |
| 2009/0044532 A1 | 2/2009 | Wu et al. | |
| 2009/0048745 A1 | 2/2009 | Wu et al. | |
| 2009/0222188 A1 | 9/2009 | Igarashi | |
| 2009/0277215 A1 | 11/2009 | Tsuboi | |
| 2009/0288648 A1 | 11/2009 | Prior et al. | |
| 2009/0291803 A1 | 11/2009 | Moeller | |

(56) References Cited

U.S. PATENT DOCUMENTS

| | | |
|---|---|---|
| 2010/0050998 A1 | 3/2010 | Ai et al. |
| 2010/0071673 A1 | 3/2010 | Prior |
| 2010/0155157 A1 | 6/2010 | Grieve |
| 2010/0263375 A1 | 10/2010 | Grieve |
| 2010/0275890 A1 | 11/2010 | McDonald-Walker |
| 2010/0314186 A1 | 12/2010 | Ma |
| 2011/0030641 A1 | 2/2011 | Wu et al. |
| 2011/0067395 A1 | 3/2011 | Suhocki |
| 2011/0083647 A1* | 4/2011 | Hansen .................. F02B 33/44 123/564 |
| 2011/0094480 A1 | 4/2011 | Suhocki et al. |
| 2011/0160946 A1 | 6/2011 | Wilde et al. |
| 2011/0204654 A1 | 8/2011 | Hansen et al. |
| 2012/0041664 A1 | 2/2012 | Hansen et al. |
| 2012/0156079 A1 | 6/2012 | Hirata et al. |
| 2013/0089413 A1 | 4/2013 | Fujimoto et al. |
| 2013/0090832 A1 | 4/2013 | Bevan et al. |
| 2013/0146035 A1 | 6/2013 | Eybergen et al. |
| 2013/0255647 A1 | 10/2013 | Akashi et al. |
| 2014/0208745 A1 | 7/2014 | Suhocki et al. |
| 2014/0224228 A1 | 8/2014 | Benjey et al. |
| 2014/0238361 A1 | 8/2014 | Tsourapas et al. |
| 2014/0283797 A1 | 9/2014 | Eybergen et al. |
| 2015/0047617 A1 | 2/2015 | Benjey et al. |
| 2015/0066272 A1 | 3/2015 | Benjey et al. |
| 2015/0260187 A1 | 9/2015 | Endo et al. |
| 2015/0291152 A1 | 10/2015 | Mould et al. |
| 2015/0330295 A1 | 11/2015 | Walls et al. |
| 2015/0361905 A1 | 12/2015 | Lofgren |
| 2015/0377158 A1 | 12/2015 | Benjey et al. |
| 2016/0001649 A1 | 1/2016 | Benjey |
| 2016/0237880 A1 | 8/2016 | Ouwenga |
| 2016/0319733 A1 | 11/2016 | Benjey et al. |
| 2017/0009678 A1 | 1/2017 | Cloos et al. |
| 2017/0059008 A1 | 3/2017 | Kashyap et al. |
| 2017/0204781 A1 | 7/2017 | Benjey et al. |

FOREIGN PATENT DOCUMENTS

| | | |
|---|---|---|
| CN | 201159098 Y | 12/2008 |
| CN | 102072011 A | 5/2011 |
| CN | 202944330 U | 5/2013 |
| DE | 32 05 721 A1 | 8/1983 |
| DE | 38 01 227 A1 | 11/1988 |
| DE | 39 33 409 A1 | 4/1991 |
| DE | 102004025929 | 12/2004 |
| DE | 102007024471 | 11/2008 |
| DE | 102010054223 A1 | 3/2012 |
| DE | 11 2005 000486 B4 | 8/2014 |
| EP | 0 222 989 A1 | 5/1987 |
| EP | 1 314 884 A2 | 5/2003 |
| EP | 1 462 629 A1 | 9/2004 |
| EP | 1 895 130 A1 | 3/2008 |
| EP | 2 054 596 B1 | 10/2011 |
| GB | 476729 | 12/1937 |
| GB | 2 456 600 A | 7/2009 |
| JP | 60001328 A | 1/1985 |
| JP | 60001329 A | 1/1985 |
| JP | 60-075722 A | 4/1985 |
| JP | 61-4889 A | 1/1986 |
| JP | 61-159689 U | 10/1986 |
| JP | 62-101830 A | 5/1987 |
| JP | 2-24042 U | 2/1990 |
| JP | 2-188625 A | 7/1990 |
| JP | 3-179141 A | 8/1991 |
| JP | 3-225028 A | 10/1991 |
| JP | 5-42645 | 6/1993 |
| JP | 5-263649 A | 10/1993 |
| JP | 7-097939 A | 4/1995 |
| JP | 2000-230427 | 8/2000 |
| JP | 2001-073784 A | 3/2001 |
| JP | 2002-357127 | 12/2002 |
| JP | 2003-161156 A | 6/2003 |
| JP | 2004-308646 | 11/2004 |
| JP | 2005-042553 A | 2/2005 |
| JP | 2005-054612 A | 3/2005 |
| JP | 2005-188318 A | 7/2005 |
| JP | 2005-291020 A | 10/2005 |
| JP | 2006-083767 A | 3/2006 |
| JP | 2006-233803 A | 9/2006 |
| JP | 2006-258094 A | 9/2006 |
| JP | 2006-307648 A | 11/2006 |
| JP | 2007-016721 A | 1/2007 |
| JP | 2007-104855 A | 4/2007 |
| JP | 2007-192092 A | 8/2007 |
| JP | 2008-063974 A | 3/2008 |
| JP | 2008-215074 A | 9/2008 |
| JP | 2008-215075 A | 9/2008 |
| JP | 2009-243268 A | 10/2009 |
| JP | 2010-065656 A | 3/2010 |
| KR | 2005-0039187 A | 4/2005 |
| KR | 2007-0005461 A | 1/2007 |
| WO | WO 2004/072449 A1 | 8/2004 |
| WO | WO 2006/134330 A1 | 12/2006 |
| WO | WO 2008/020184 A1 | 2/2008 |
| WO | WO 2009/136994 A1 | 11/2009 |
| WO | WO 2013/049438 A2 | 4/2013 |
| WO | WO 2013/049439 A2 | 4/2013 |

OTHER PUBLICATIONS

Partial European Search Report and Written Opinion Corresponding to EP Application No. 20156105.7.

* cited by examiner

ADAPTIVE STATE OF CHARGE REGULATION AND CONTROL OF VARIABLE SPEED HYBRID ELECTRIC SUPERCHARGER ASSEMBLY FOR EFFICIENT VEHICLE OPERATION

RELATED APPLICATIONS

This application is a Divisional of U.S. patent application Ser. No. 14/849,095, filed on Sep. 9, 2015, now U.S. Pat. No. 10,125,698, which is a Continuation of PCT/US2014/024898, filed Mar. 12, 2014, which claims the benefit of U.S. patent application Ser. No. 61/776,834 filed on Mar. 12, 2013, U.S. patent application Ser. No. 61/776,837 filed on Mar. 12, 2013, and U.S. patent application Ser. No. 61/861,111 filed on Aug. 1, 2013 and which applications are incorporated herein by reference. To the extent appropriate, a claim of priority is made to each of the above disclosed applications.

TECHNICAL FIELD

The present teachings generally include a supercharger assembly that includes a supercharger, an electric motor-generator, and a planetary gearing arrangement.

BACKGROUND

Energy efficient engines of reduced size are desirable for fuel economy and cost reduction. Smaller engines provide less torque than larger engines. A supercharger is sometimes used to increase the torque available from an engine. At low engine speeds, when higher torque is often requested by a vehicle operator by depressing the accelerator pedal, the supercharger provides additional air to the engine intake manifold, boosting air pressure and thereby allowing the engine to generate greater torque at lower engine speeds.

SUMMARY

The present teachings generally include a method for regulating a state of charge of an energy storage device of a supercharger assembly for a vehicle including: monitoring driving characteristics of the vehicle; using the driving characteristics to determine a reference state of charge; comparing the reference state of charge to an actual state of charge of the energy storage device; and when a difference between the reference state of charge and the actual state of charge indicates a deficit, selecting an operating mode to regenerate the energy storage device. The driving characteristics may include a driving style, one or more driving conditions, and traffic information.

The step of monitoring of the driving style may include determining an aggressive driving style and a passive driving style. The method may further include increasing the reference state of charge when the driving style is the aggressive driving style so that additional energy is available from the energy storage device to power an electric motor to provide enhanced boosting from a supercharger of the supercharger assembly.

In addition or alternatively, the step of monitoring of the driving conditions includes determining an aggressive city condition, a mild city condition, and a highway condition. The method may further include selecting a nonperformance-impacting mode when the driving conditions include the mild city condition or the highway condition.

The step of selecting the operating mode may include selecting between performance-impacting modes and non-performance-impacting modes. The method may further include selecting a nonperformance-impacting mode to decrease an impact of regeneration of the energy storage device.

The method may further include using a supercharger of the supercharger assembly to regenerate the energy storage device. The method may further include allowing the supercharger to rotate an electric motor-generator of the vehicle to regenerate the energy storage device.

In another example, a method for regenerating an energy storage device used to power an electric motor-generator of a vehicle includes: monitoring a driving style, one or more driving conditions and/or traffic information, wherein the driving style includes determining an aggressive driving style and a passive driving style, and wherein the driving conditions include a city condition indicating city driving and a highway condition indicating high cruising; using the driving style and the driving conditions to determine a reference state of charge; comparing the reference state of charge to an actual state of charge of the energy storage device; and when a difference between the reference state of charge and the actual state of charge indicates a deficit, selecting an operating mode to regenerate the energy storage device.

In yet another example, a method for regulating a state of charge of an energy storage device of a supercharger assembly for a vehicle, the energy storage device powering a supercharger of the vehicle, includes: monitoring a driving style, one or more driving conditions, and/or traffic information, wherein the driving style includes determining an aggressive driving style and a passive driving style, and wherein the driving conditions include an aggressive city condition, a mild city condition, and a highway condition; using the driving style and the driving conditions to determine a reference state of charge; comparing the reference state of charge to an actual state of charge of the energy storage device; when a difference between the reference state of charge and the actual state of charge indicates a deficit, selecting between one or more performance-impacting modes and one or more nonperformance-impacting modes; and rotating an electric motor-generator of the vehicle using the supercharger of the supercharger assembly to regenerate the energy storage device.

The method may further include comparing the actual state of charge of the energy storage device to a threshold indicating a full capacity for the energy storage device; and, when the state of charge exceeds the threshold, using the electric motor-generator to drive the vehicle to reduce the state of charge.

Moreover, the present teachings generally include a supercharger assembly for an engine including: a supercharger configured to provide boost to the engine; an electric motor coupled to the supercharger; and a planetary gearing arrangement coupled between the engine, the electric motor, and the engine, the planetary gearing arrangement being configured to: increase power transferred to the supercharger by the engine using the electric motor to increase the boost to the engine; and decrease power transferred to the supercharger by the engine to decrease the speed of the supercharger to decrease the boost to the engine.

The operating mode may include one of an economy performance mode and an enhanced performance mode. The boost may be increased in the enhanced performance mode. The electric motor operates to drive the supercharger to increase the boost. The boost may be decreased in the economy performance mode. The planetary gearing arrangement operates to decrease the power transferred to the supercharger by the engine.

A mapping may be used to correlate a desired torque and speed of the engine to a characteristic of the supercharger. The characteristic may include mass air flow.

In another example, a method for boosting an engine using a supercharger includes: receiving a selection of a performance mode; when an enhanced performance mode is selected, increasing a speed of the supercharger to greater than that provided by the power of the engine; and when an economy performance mode is selected, decreasing the speed of the supercharger to less than that provided by the power of the engine.

The step of increasing of the speed of the supercharger may further include using an electric motor to increase the speed. The step of decreasing of the speed of the supercharger may further include using a gearing system to decrease the speed.

The method may further include mapping a desired torque and speed to a mass air flow and pressure to control an input to the supercharger. The method may further include providing feedback to manipulate the input to the supercharger. In addition or alternatively, the method may further comprise determining a difference between a requested air flow and an actual air flow to provide the mapping. The method may further include controlling a bypass valve and a throttle to create the requested air flow.

In yet another example, a method for boosting an engine using a supercharger includes: receiving a selection between an economy performance mode and an enhanced performance mode; when an enhanced performance mode is selected, increasing a speed of the supercharger using an electric motor to greater than that provided by the power of the engine; and when an economy performance mode is selected, decreasing the speed of the supercharger to less than that provided by the power of the engine. The step of decreasing of the speed of the supercharger may further include using a gearing system to decrease the speed.

The method may further include mapping a desired torque and speed to a mass air flow and pressure to control an input to the supercharger. The method may further include determining a difference between a requested air flow and an actual air flow to provide the mapping; and controlling a bypass valve and a throttle to create the requested air flow.

The above features and advantages and other features and advantages of the present teachings are readily apparent from the following detailed description of the best modes for carrying out the present teachings when taken in connection with the accompanying drawings.

DETAILED DESCRIPTION

Figure 1:
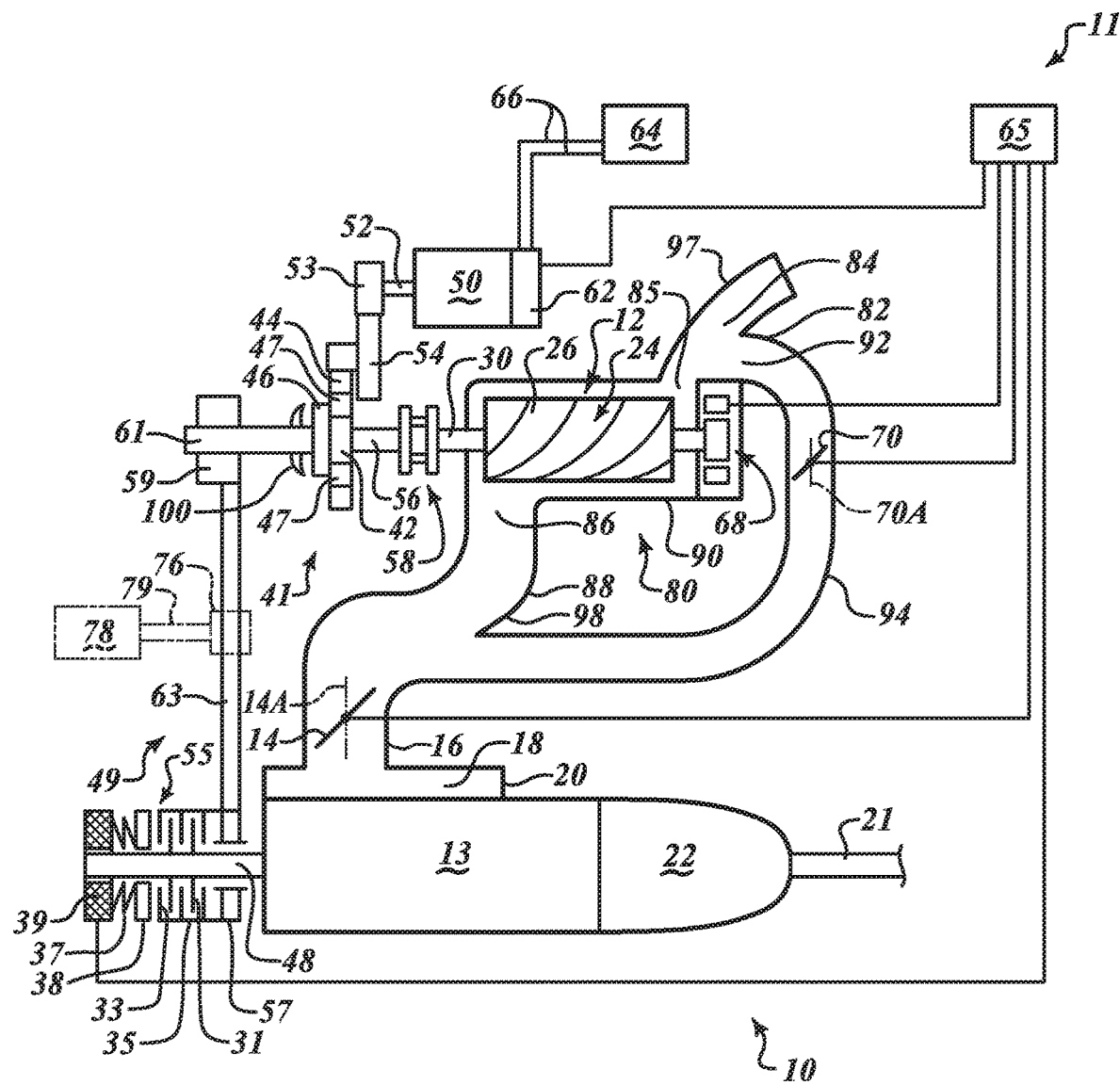
FIG. 1 is a schematic illustration in side view of a supercharger assembly and an engine assembly, with a housing assembly of the supercharger assembly partially removed, in accordance with an aspect of the present teachings.

Referring to the drawings, wherein like reference numbers refer to like components throughout the several views, FIG. 1 shows an engine assembly 10 that includes a supercharger assembly 11 with a supercharger 12 placed in series with a throttle valve, also referred to herein as a throttle 14, positioned in a throttle body 16 of an engine 13. The throttle body 16 is in the air flow to the engine 13 upstream of a plenum 18 in an air intake manifold 20. Although the supercharger 12 is shown upstream of the throttle 14 in air flow to the engine 13, the supercharger 12 could instead be downstream of the throttle 14 in air flow to the engine 13. That is, the throttle 14 could feed into an inlet 84 of the supercharger 12, and an outlet of the supercharger 12 could flow directly to the plenum 18. It should be appreciated that the supercharger 12 could also be used with an engine that does not have a throttle, such as a diesel engine.

Figure 3:
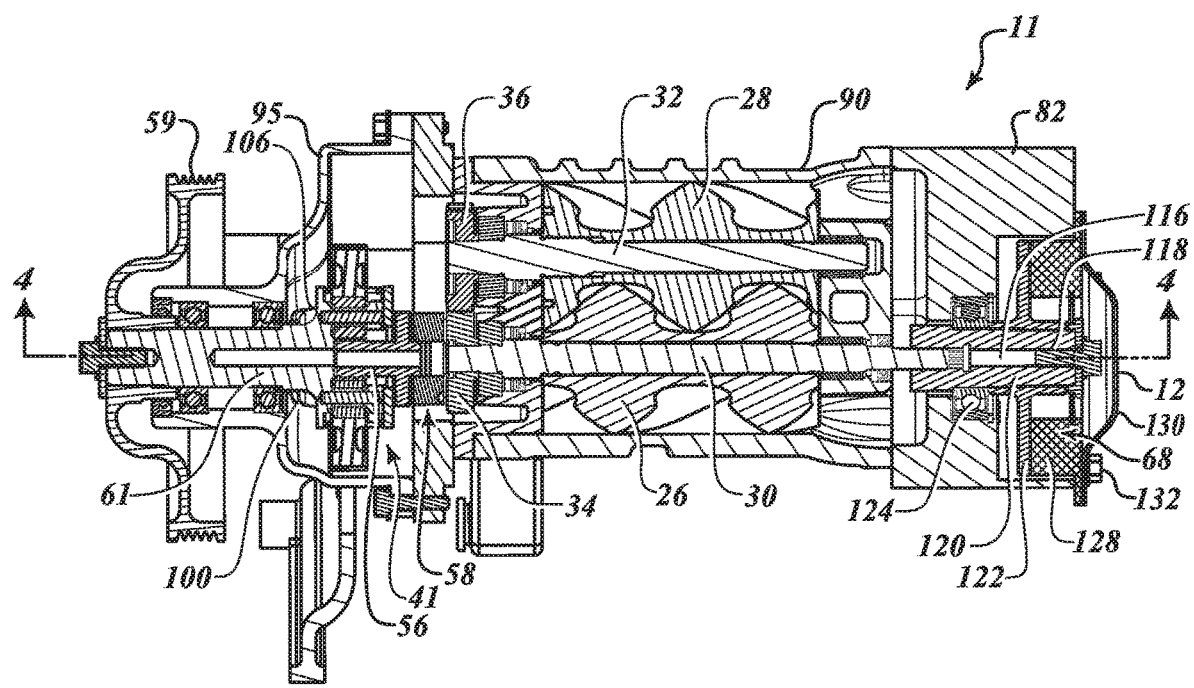
FIG. 3 is a schematic illustration in cross-sectional view of the supercharger assembly taken at lines 3-3 in FIG. 2.

The supercharger 12 can have a set of rotors 24 with a first rotor 26 that can mesh with a second rotor 28 (the second rotor 28 being visible in FIG. 3). Each of the rotors 26, 28 has multiple lobes. The supercharger 12 can boost the air pressure upstream of the plenum 18, forcing more air into engine cylinders, and thus increasing engine power to power a drive axle 21 through a transmission 22.

The supercharger 12 can be a fixed displacement supercharger, such as a Roots-type supercharger, that outputs a fixed volume of air per rotation. The increased air output then becomes pressurized when forced into the plenum 18. A Roots-type supercharger is a volumetric device, and therefore is not dependent on rotational speed in order to develop pressure. The volume of air delivered by the Roots-type supercharger per each rotation of the rotors 26, 28 is constant (i.e., does not vary with speed). A Roots-type supercharger can thus develop pressure at low engine and rotor speeds (where the supercharger is powered by the engine) because the Roots-type supercharger functions as a pump rather than as a compressor. Compression of the air delivered by the Roots-type supercharger 12 takes place downstream of the supercharger 12 by increasing the mass of air in the fixed volume engine plenum 18. Alternatively, the supercharger 12 can be a compressor, such as a centrifugal-type supercharger that compresses the air as it passes through the supercharger 12, but with the compression and thus the volume of air delivered to the throttle body 16 and air pressure in the plenum 18 being dependent on compressor speed.

The supercharger assembly 11 includes a planetary gearing arrangement 41 with a sun gear member 42, a ring gear member 44, and a carrier member 46 that rotatably supports a set of pinion gears 47 that can mesh with both the ring gear member 44 and the sun gear member 42. The sun gear member 42 is referred to as the third member, the ring gear member 44 is referred to as the first member, and the carrier member 46 is referred to as the second member of the planetary gear set 41. The planetary gear set 41 is a simple planetary gear set. In other examples, a compound planetary gear set can be used.

As shown in FIG. 3, the first rotor 26 rotates on a first shaft 30 and has multiple lobes that mesh via a set of intermeshing timing gears 34, 36 with multiple lobes of the second rotor 28. It should be understood that the rotors 26, 28 mesh in that their lobes interfit with one another when the rotors 26, 28 are rotating. However, the lobes of the rotors 26, 28 do not contact one another. The second rotor 28 rotates on a second shaft 32. The second shaft 32 is driven by the first shaft 30 through the set of intermeshing timing gears 34, 36. Specifically, a first gear 34 is mounted on the first shaft 30 to rotate with the first rotor 26. A second gear 36 is mounted on the second shaft 32 to rotate with the second rotor 28. The first gear 34 meshes with the second gear 36.

As shown in FIG. 1, the engine 13 has a crankshaft 48 that can be operatively connected with the carrier member 46 through a belt drive 49 when an electromagnetic clutch 55 is engaged to connect a pulley 57 mounted on the crankshaft 48 for rotation with the crankshaft 48. The pulley 57 and crankshaft 48 are thereby drivingly connected through a belt 63 with a pulley 59 mounted to a pulley shaft 61 to rotate with the pulley shaft 61. The pulley shaft 61 is connected to rotate with the carrier member 46 at the same speed as the carrier member 46.

The clutch 55 is a normally closed clutch, in a normally engaged state in which a clutch pack has a first set of plates 31 splined to the crankshaft 48 engaged with a second set of plates 33 splined to a clutch housing 35 that is rigidly connected for rotation with the pulley 57. A spring 37 biases an apply plate 38 toward the sets of plates 31, 33 to maintain the clutch 55 in an engaged state. A coil 39 is energized to create a magnetic force to move the plate 38 axially away from the clutch plates 31, 33, overcoming the biasing force of the spring 37, and thereby disengaging the clutch 55. The coil 39 is selectively energized by a control system that includes a system controller 65, such as an engine controller, operable to provide control signals to clutch 55. The controller 65 is also operatively connected to the motor controller 62, and to an electromagnetic brake, a bypass valve 70 and the throttle 14, as discussed herein. Any other type of clutch, including a normally open clutch, can be used in place of clutch 55.

An electric motor-generator/generator 50 can transfer torque to or receive torque from the ring gear member 44 through a gear train that includes a first gear member 53 that meshes with a second gear member 54. The motor-generator 50 has a rotatable motor shaft 52 with the first gear member 53 mounted on the motor shaft 52. The first gear member 53 can mesh with the second gear member 54, which can be a stepped gear member that meshes with the ring gear member 44. The sun gear member 42 rotates with a shaft 56 that is connected to the first shaft 30 through a semi-flexible coupling member 58 so that the sun gear member 42 rotates at the same speed as the first rotor 26 of the supercharger 12. The coupling member 58 flexes to absorb torsional and axial vibrations between the first shaft 30 and a shaft 56 connected with the sun gear member 42. Rotation of the first rotor 26 causes rotation of the second rotor 28 via the intermeshing gears 34, 36.

The electric motor-generator 50 has an integrated electronic motor controller 62 that controls operation of the motor-generator 50 to function as a motor or as a generator. When the motor-generator 50 functions as a motor, it receives stored electrical energy from an energy storage device 64 such as a battery through power cables 66. The controller 62 may include a power inverter to convert the electrical energy from direct current to alternating current when energy flows from the energy storage device 64 to the motor-generator 50, and from alternating current to direct current when energy flows from the motor-generator 50 to the energy storage device 64. The system controller 65 can be an engine controller, operatively connected to the motor controller 62 via CAN bus or similar architecture, and is also configured to control engagement of the clutch 55, engagement of a brake 68, discussed herein, the position of the throttle 14, and the position of a bypass valve 70.

The belt drive 49 may be referred to as a front engine accessory drive (FEAD). One or more vehicle accessories 78 can be driven by the engine crankshaft 48 via the belt 63 of the belt drive 49 when clutch 55 is engaged or by the motor-generator 50 when the clutch 55 is not engaged, brake 68 is engaged to stop the sun gear 42 and the engine 13 is off, such as during an engine start/stop mode discussed herein. The vehicle accessories 78, such as an engine coolant pump or an air conditioning compressor, are operatively connected to a shaft 79 that rotates with a pulley 76 driven by the belt 63.

The sun gear member 42 is connected for common rotation with the first rotor 26 by the shafts 56, 30 and through the coupling member 58. The brake 68 can be controlled by the system controller 65, to selectively ground the first shaft 30 to a stationary housing assembly 80 of the supercharger assembly 11. Specifically, the brake 68 is an electromagnetic brake packaged in a cavity 69 (shown in FIG. 4) of an inlet cover portion 82 of the housing assembly 80 so that the inlet cover portion 82 supports the brake 68. The brake 68 is selectively actuated to ground the first shaft 30 to the inlet cover portion 82, as further described with respect to FIG. 4.

Air flows across the supercharger assembly 11, between the rotors 26, 28, from an air inlet 84 of an air inlet passage 85 in the inlet cover portion 82, shown schematically in FIG. 1, through an air inlet opening 84A (shown in FIG. 21) of the rotor housing portion 90, to an air outlet 86 (best shown in FIG. 23) of an air outlet passage 88 partially defined by a rotor housing portion 90 of the housing assembly 80. The rotor housing portion 90 radially surrounds the rotors 26, 28 and the shafts 30, 32. Shaft 30 extends out of an axial end of the rotor housing portion 90 into the inlet cover portion 82. A portion 92 of a bypass passage 94 is defined by the inlet cover portion 82. The bypass passage 94 is also referred to as a bypass route. The bypass valve 70 is supported within the bypass passage 94 and substantially closes the bypass passage 94 when in the closed position shown in FIG. 1. The position of the bypass valve 70 is schematic, and is intended to represent a position in which air flow through the passage 94 is completely blocked by the valve 70. The bypass valve 70 can be controlled by the controller 65 to move to an open position 70A shown in phantom in FIG. 1. When the bypass valve 70 is in the open position 70A, air can flow from the air inlet portion 84 through the bypass passage 94 to the throttle body 16, bypassing the rotors 26, 28, such as when engine boost is not desired.

Figure 2:
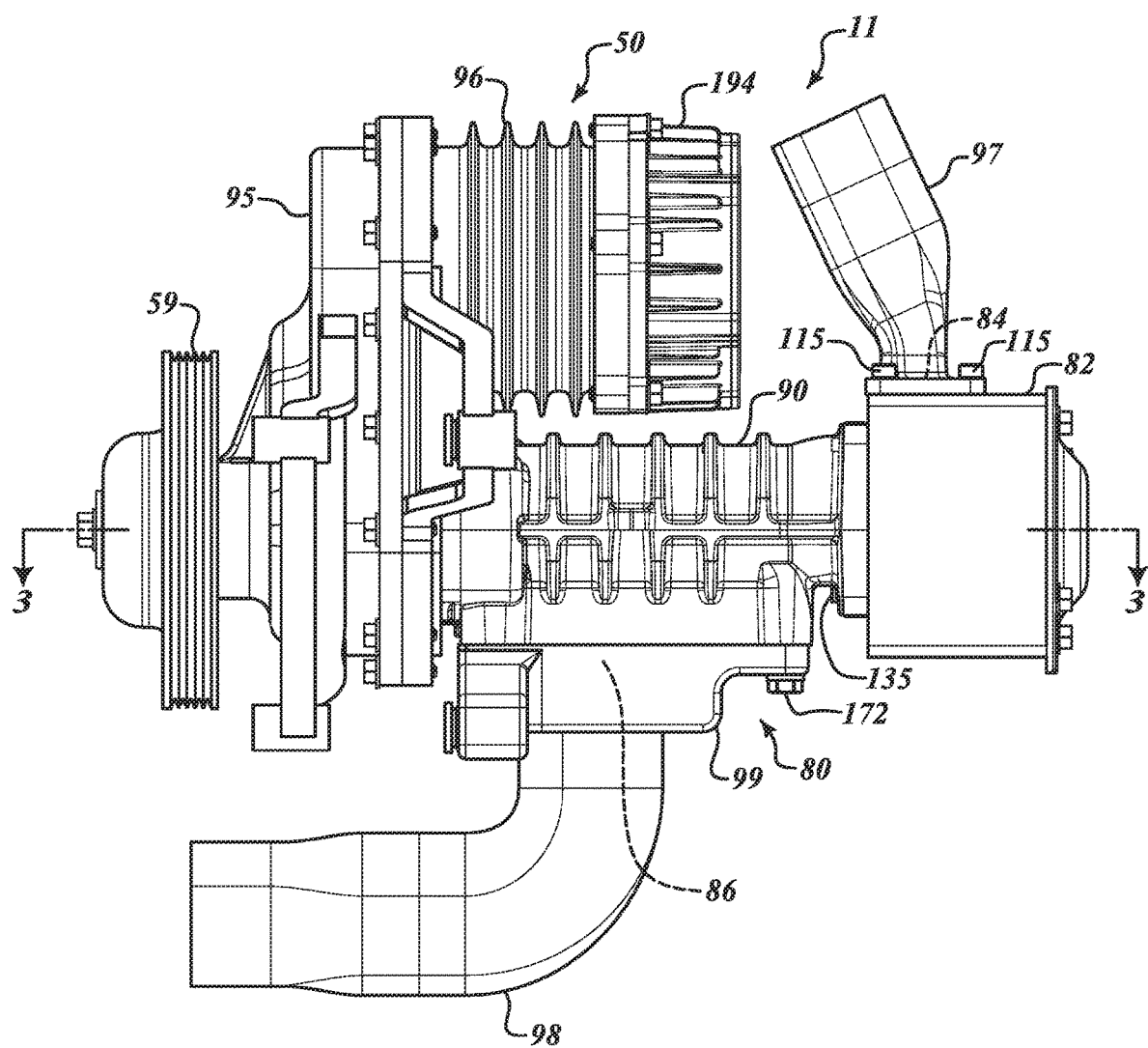
FIG. 2 is a schematic illustration in side view of the supercharger assembly of FIG. 1 within the housing assembly.
Figure 4:
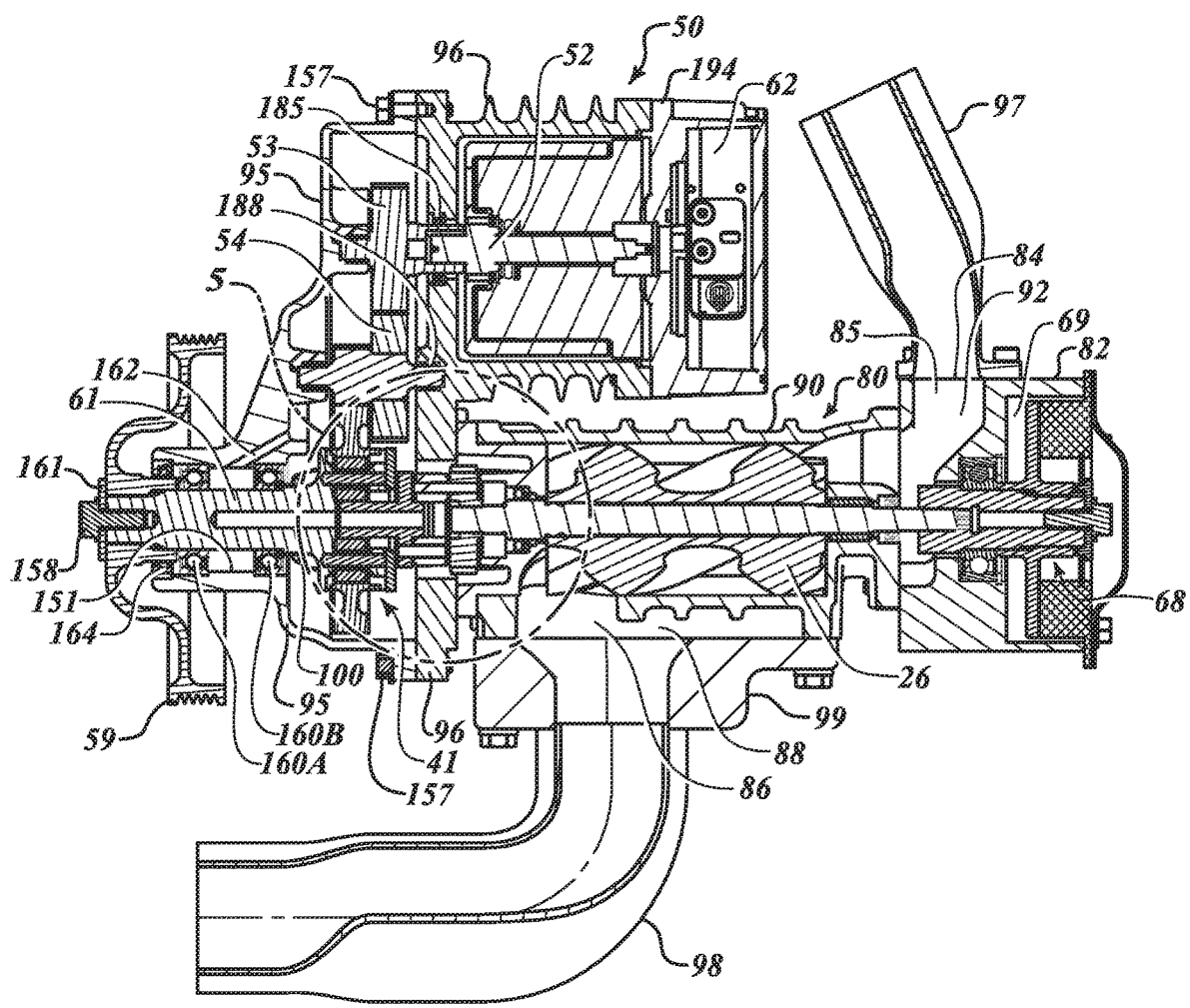
FIG. 4 is a schematic illustration in cross-sectional view of the supercharger assembly taken at lines 4-4 in FIG. 3.

FIGS. 2 and 4 show a gear cover portion 95 mounted to the rotor housing portion 90 to surround and enclose the planetary gearing arrangement 41 and the gear members 53, 54. A motor housing portion 96 of the motor-generator 50 mounts to the gear cover portion 95. Both the gear cover portion 95 and the motor housing portion 96 are portions of the stationary housing assembly 80. The housing assembly 80 includes an inlet pipe 97 that attaches to the inlet cover portion 82 to extend the inlet passage 85. The housing assembly 80 also includes an outlet pipe 98 attached to an outlet housing 99 that mounts to the rotor housing portion 90 to extend the outlet passage 88. The outlet pipe 98 operatively connects to the throttle body 16 shown in FIG. 1 through an additional pipe extension (not shown) connected to the outlet pipe 98.

Movement of pistons within the engine cylinders creates a vacuum that pulls air through the plenum 18. When the throttle 14 is in the relatively closed position shown in FIG. 1, the vacuum created by the engine 13 creates a pressure differential in the form of a pressure drop across the throttle 14. When the throttle 14 is moved to a relatively open position 14A, the pressure drop across the throttle 14 is relieved. However, by controlling the motor-generator 50, the pressure differential can be transferred to the rotors 26, 28, creating a torque on the rotors 26, 28 that can be captured as electrical energy in the energy storage device 64.

That is, a pressure differential is created across the supercharger 12 from the air inlet 84 to the air outlet 86 upstream in air flow to the throttle 14 when the throttle 14 is in the relatively open position 14A. As described below, the throttle 14 and the bypass valve 70 can be selectively controlled in conjunction with the engine 13 to provide various operating modes, such as providing a desired intake air pressure to the engine cylinders, while allowing the supercharger 12 and the motor-generator 50 to be used to provide regenerative electrical energy to the energy storage device 64. The stored electric energy can be used to provide power to vehicle electrical systems and devices in place of an alternator and/or for providing torque at the crankshaft 48 when the motor-generator 50 is controlled to function as a motor.

The engine assembly 10 with the supercharger assembly 11 enables a variety of different operating modes that can be selected and commanded by the controller 65 based on vehicle operating conditions such as engine torque requirements, and the state of charge of the energy storage device 64. An engine-off operating mode may be used to provide torque at the shaft 61 to power the auxiliary vehicle components 78 when the engine 13 is off. As used herein, the engine 13 is off when fuel and/or ignition is not provided for combustion in the engine 13. In the engine-off operating mode, the controller 65 controls the motor-generator 50 to function as a motor, engages the brake 68 and causes the clutch 55 to be disengaged. Torque is transferred from the motor-generator 50 to the auxiliary components 78 through the planetary gear set 41.

If vehicle operating conditions indicate that the engine 13 should be started, the engine assembly 10 can be transitioned from the engine-off operating mode to an engine-start operating mode simply by engaging the clutch 55 while still controlling the motor-generator 50 to function as a motor and keeping the brake 68 engaged. Torque from the motor-generator 50 will thus be applied to the crankshaft 48 to start the engine 13. Once the engine 13 is started, the motor-generator 50 can freewheel, with the controller 65 neither directing electric energy from the energy storage device 64 to the motor-generator 50, nor directing electric energy from the motor-generator 50 to the energy storage device 64. The start/stop ability of the motor-generator 50 allows the engine 13 to be shut off rather than idle, such as at traffic lights, with an expected increase in fuel economy and reduction in carbon dioxide emissions. Thus, fuel savings can be realized during the period that the engine 13 is shutoff, and restarting the engine 13 can be accomplished with the electric energy generated from recaptured energy stored in the battery.

Alternatively, once the engine 13 is started, the motor-generator 50 can function either as a motor or as a generator. With the engine 13 on, engine boost, brake regeneration and throttle loss regeneration modes described herein may be used. See FIGS. 25-30. An engine boost operating mode can be established by the controller 65 when additional torque is required at the drive axle 21, such as for vehicle acceleration. To establish the boost operating mode with the engine 13 on, the clutch 55 is engaged and the brake 68 is disengaged. The motor-generator 50 is controlled to function as a motor and the bypass valve 70 is in the closed position shown in FIG. 1. The engine 13 provides torque to drive the first shaft 30 through the belt drive system 49 and the carrier member 46. The motor-generator 50 provides torque to drive the first shaft 30 through the intermeshing gears 53, 54 to the ring gear member 44. The speed of the first shaft 30 is thus increased relative to the speed of shaft 61 using the motor-generator 50 to adjust the speed of ring gear member 44 and, through the planetary gearing arrangement 41, set the desired rotational speed of shafts 56 and 30, providing desired boost pressure.

The amount of boost pressure provided at the engine plenum 18 can thus be varied during the engine boost operating mode in response to varying torque demand. First, the controller 65 can vary the speed of the motor-generator 50 to control the amount of boost pressure developed in the plenum 18 during the engine boost operating mode. Alternately or in addition, the controller 65 can control the position of the bypass valve 70, such as by moving the bypass valve 70 from the closed position shown in FIG. 1 to the open position 70A. Air from the air inlet 84 can thus flow through the bypass passage 94, reducing the volume of air that will flow through the rotor housing 90 past the rotors 26, 28 and thereby reducing the pressure of air at the plenum 18 in comparison to pressure that develops when air flows through the rotors 26, 28. Operation of the bypass valve 70 by opening the bypass valve 70 to the fully open position 70A can allow a relatively quick adjustment in air pressure in the plenum 18 in comparison to a more gradual adjustment achieved by changing the speed of the motor-generator 50. A more modulated adjustment in boost pressure can be achieved by placing the bypass valve 70 in an intermediate position between the fully open position 70A and a fully closed position. Control of both the speed of the motor-generator 50 and the position of the bypass valve 70 allows a tailored engine boost in response to engine torque demand. Because the boost pressure provided in the plenum 18 by the supercharger 12 is independent of engine speed, a relatively constant torque can be obtained at the crankshaft 48 across the entire range of operating speeds of the engine 13. Alternately, the torque at the crankshaft 48 can be tailored as desired across the range of engine operating speeds.

When the engine 13 is on and engine boost is not required, such as during vehicle cruising at a relatively steady vehicle speed, the controller 65 can slow the speed of the supercharger 12 and control the throttle 14 so that the throttling losses (i.e., the pressure drop associated with the vacuum created by the moving engine cylinders) can be applied across both the throttle 14 and the supercharger 12 with the bypass valve 70 closed. The position of the throttle 14 can be balanced with the pressure drop desired across the supercharger 12 and air flows through both the supercharger 12 and past the at least partially closed throttle 14 to reach the engine cylinders. The bypass valve 70 can also be controlled during this mode to allow air to bypass the supercharger 12 when a rapid change in air flow to the engine 13 is required. The torque generated by the pressure drop across the supercharger 12 will be applied to the sun gear member 42, and thus to the engine crankshaft 48 and also to the motor-generator 50 (when controlled to operate as a generator) via the torque split provided by the planetary gearing arrangement 41. This operating mode can be referred to as a throttling loss regeneration mode. See FIG. 26. All or a portion of the torque generated by the pressure drop across the supercharger 12 can be converted to electric energy stored in the energy storage device 64 by controlling the motor-generator 50 to function as a generator. The stored electric energy generated from the pressure drop-induced torque is referred to as being from "recaptured throttling losses."

During an extended cruising period, when engine boost is not required, the throttling loss regeneration mode can be maintained until the energy storage device 64 reaches a predetermined maximum state of charge. Then, the brake 68 can be applied, the bypass valve 70 opened to position 70A, and the motor-generator 50 controlled to function as a motor to apply torque to the engine crankshaft 48 until the energy storage device 64 reaches a predetermined minimum state of charge. This cycling of charging and depleting the energy storage device 64 can continue throughout the cruising period.

The supercharger assembly 11 can also be controlled to capture energy during vehicle braking in a regenerative braking mode. See FIG. 27. When vehicle braking slows the drive axle 21, the controller 65 is configured to engage the brake 68 and control the electric motor-generator 50 to function as a generator with torque applied to the electric motor-generator 50 in a reverse direction that is the opposite of the direction of torque supplied by the electric motor-generator 50 when the electric motor-generator functions as a motor. Reverse torque is thus applied to the crankshaft 48 through the planetary gearing arrangement 41 and electric energy generated by the electric motor-generator 50 is stored in the energy storage device 64. The regenerative braking mode and the throttle loss regeneration mode, as well as other vehicle operating modes, are described in further detail with reference to FIGS. 25-32.

In other vehicle operating modes (including the regenerative braking and throttle loss regeneration modes) than the engine boost operating mode, the engine assembly 10 and the supercharger assembly 11 provide regeneration of the energy storage device 64. In these examples, the controller 65 is used to select an appropriate operating mode based upon vehicle operating conditions. If regeneration is appropriate, an operating mode involving regeneration is selected.

Figure 25:
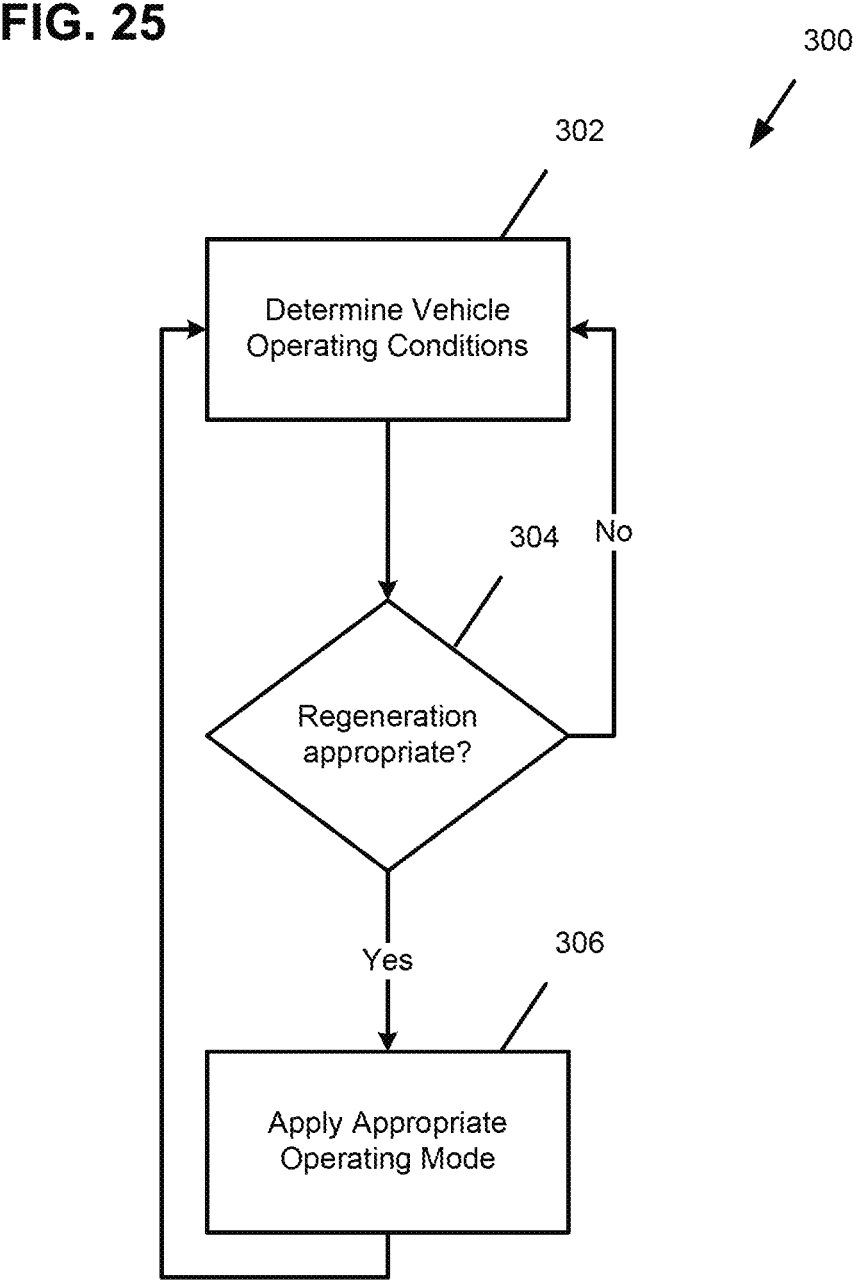
FIG. 25 is a flowchart illustration of an example method for selecting an appropriate operating mode for regeneration.

For example, referring now to FIG. 25, an example method 300 for selecting an appropriate operating mode for regeneration is shown. In this example, the method 300 is implemented by the controller 65, which monitors operating conditions and selects the appropriate operating mode.

At operation 302, the controller 65 determines the current vehicle operating conditions. Factors such as vehicle speed, torque requirements, and state of charge of the energy storage device 64 are considered by the controller 65. The controller 65 can further consider traffic information.

Next, at operation 304, the controller determines if regeneration is appropriate. If so, control is passed to operation 306, and the controller selects an appropriate operating mode for regeneration. If not, control is instead passed back to operation 302 for reevaluation of the vehicle operating conditions at a later point in time.

For example, if the controller 65 determines that the vehicle is accelerating rapidly and that boost is necessary, regeneration is not appropriate. So, the controller 65 would pass control back to operation 302 in that scenario. Conversely, if the vehicle is traveling at a constant rate of speed, such as on a highway, the controller 65 would pass control to operation 306 to select the appropriate mode for regeneration.

There are various regeneration operating modes that result in regeneration. Some of these regeneration operating modes are "nonperformance-impacting" in that the regeneration operating modes involve the recapture of energy that would otherwise be lost or otherwise does not appreciably impact the performance of the vehicle. See FIGS. 26-28. Some other regeneration operating modes are "performance-impacting" in that the regeneration operating modes involve the capture of energy that would otherwise be used for another purpose, such as propelling the automobile. See FIGS. 29-30. Each of the regeneration operating modes is described below.

Figure 26:
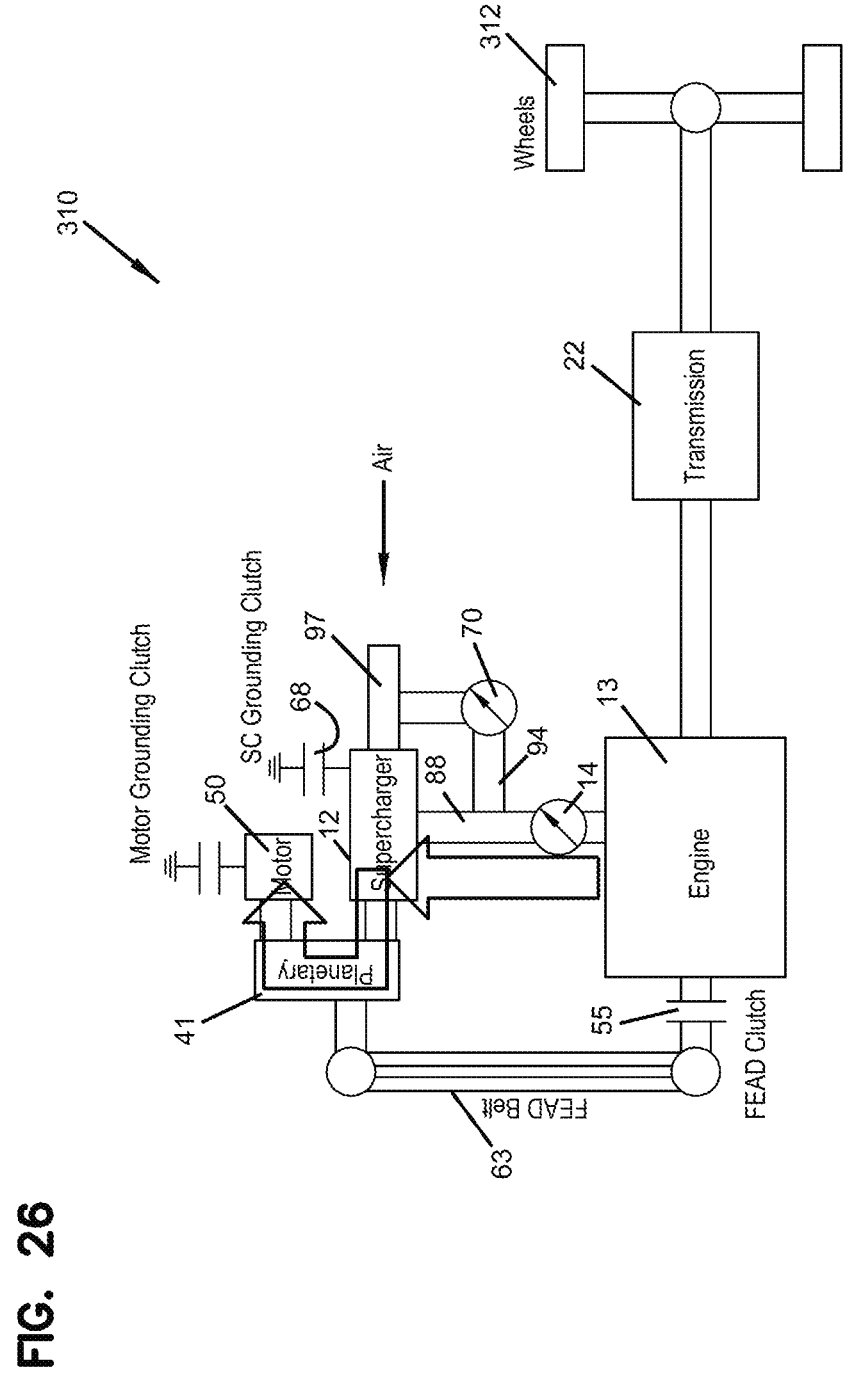
FIG. 26 is a schematic illustration in side view of the supercharger assembly and an engine assembly of FIG. 1 operating in a throttling loss regeneration mode.

Referring to FIG. 26, a "nonperformance-impacting" operating mode, referred to as a throttling loss regeneration mode 310, is shown. In this example, the throttle 14 is fully opened, and the pressure drop across the supercharger 12 provides torque for regeneration.

When the engine 13 is on and engine boost is not required, such as during vehicle cruising at a relatively steady vehicle speed, the controller 65 can slow the speed of the supercharger 12 and control the throttle 14 so that the throttling losses (i.e., the pressure drop associated with the vacuum created by the moving engine cylinders) can be applied across both the throttle 14 and the supercharger 12 with the bypass valve 70 closed. The position of the throttle 14 can be balanced with the pressure drop desired across the supercharger 12 and air flows through both the supercharger 12 and past the at least partially closed throttle 14 to reach the engine cylinders. The bypass valve 70 can also be controlled during this mode to allow air to bypass the supercharger 12 when a rapid change in air flow to the engine 13 is required. The torque generated by the pressure drop across the supercharger 12 will be applied to the sun gear member 42, and thus to the engine crankshaft 48 and also to the motor-generator 50 (when controlled to operate as a generator) via the torque split provided by the planetary gearing arrangement 41. All or a portion of the torque generated by the pressure drop across the supercharger 12 can be converted to electric energy stored in the energy storage device 64 by controlling the motor-generator 50 to function as a generator. The stored electric energy generated from the pressure drop-induced torque is referred to as being from "recaptured throttling losses."

During an extended cruising period, when engine boost is not required, the throttling loss regeneration mode 310 can be maintained until the energy storage device 64 reaches a predetermined maximum state of charge. Then, the brake 68 can be applied, the bypass valve 70 opened to position 70A, and the motor-generator 50 controlled to function as a motor to apply torque to the engine crankshaft 48 until the energy storage device 64 reaches a predetermined minimum state of charge. This cycling of charging and depleting the energy storage device 64 can continue throughout the cruising period.

Figure 27:
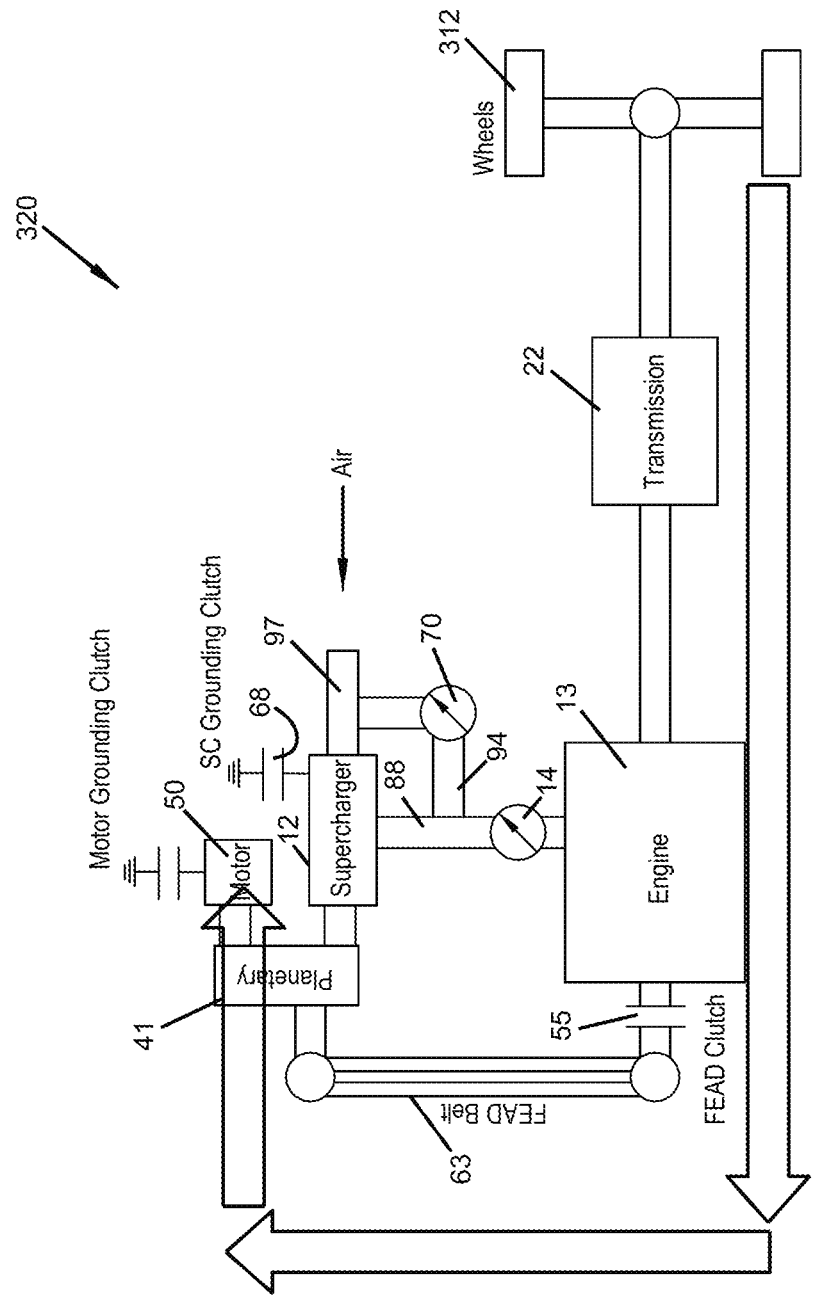
FIG. 27 is a schematic illustration in side view of the supercharger assembly and an engine assembly of FIG. 1 operating in a braking with supercharger locked regeneration mode.

Referring to FIG. 27, another "nonperformance-impacting" operating mode, referred to as a braking with supercharger locked regeneration mode 320, is shown. In this example, the supercharger 12 is locked, and negative torque from the electric motor-generator 50 is supplied to support braking of the vehicle, which in turn provides torque for regeneration.

The supercharger assembly 11 can also be controlled to capture energy during vehicle braking in the braking with supercharger locked regeneration mode 320. When vehicle braking slows the drive axle 21, the controller 65 is configured to engage the brake 68 and control the electric motor-generator 50 to function as a generator with torque applied to the electric motor-generator 50 in a reverse direction that is the opposite of the direction of torque supplied by the electric motor-generator 50 when the electric motor-generator functions as a motor. Reverse torque is thus applied to the crankshaft 48 through the planetary gearing arrangement 41 and electric energy generated by the electric motor-generator 50 is stored in the energy storage device 64. In this manner, energy from the braking of the vehicle is recaptured.

Figure 28:
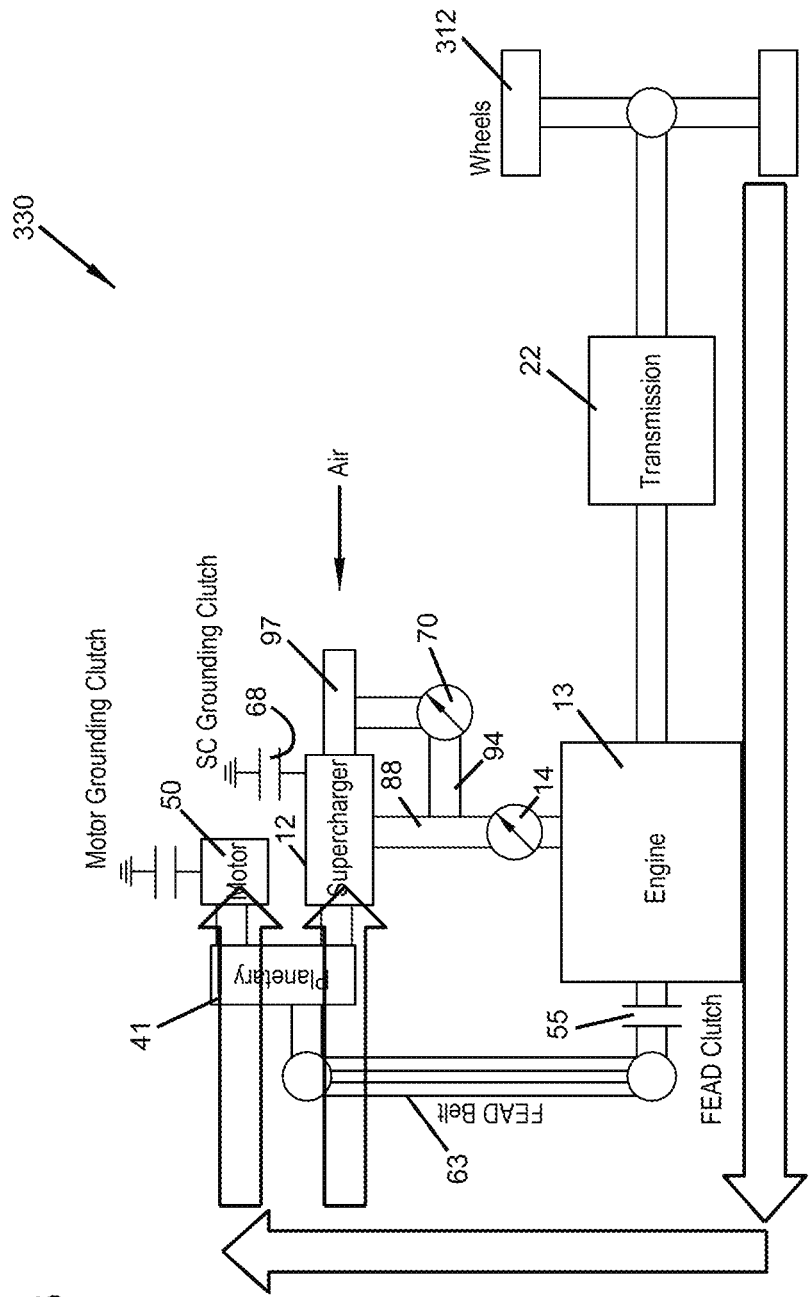
FIG. 28 is a schematic illustration in side view of the supercharger assembly and an engine assembly of FIG. 1 operating in a braking with supercharger unlocked regeneration mode.

Referring to FIG. 28, yet another "nonperformance-impacting" operating mode, referred to as a braking with supercharger unlocked regeneration mode 330, is shown. This is similar to the braking with supercharger locked regeneration mode 320 describe above, except the supercharger 12 remains unlocked. The throttle 14 and bypass valve 70 are controlled by the controller 65 during braking such that the pressure downstream of the supercharger 12 increases and cause the supercharger 12 to brake. The electric motor-generator 50 then applies negative torque to slow down the vehicle while regenerating energy to charge the energy storage device 64.

Figure 29:
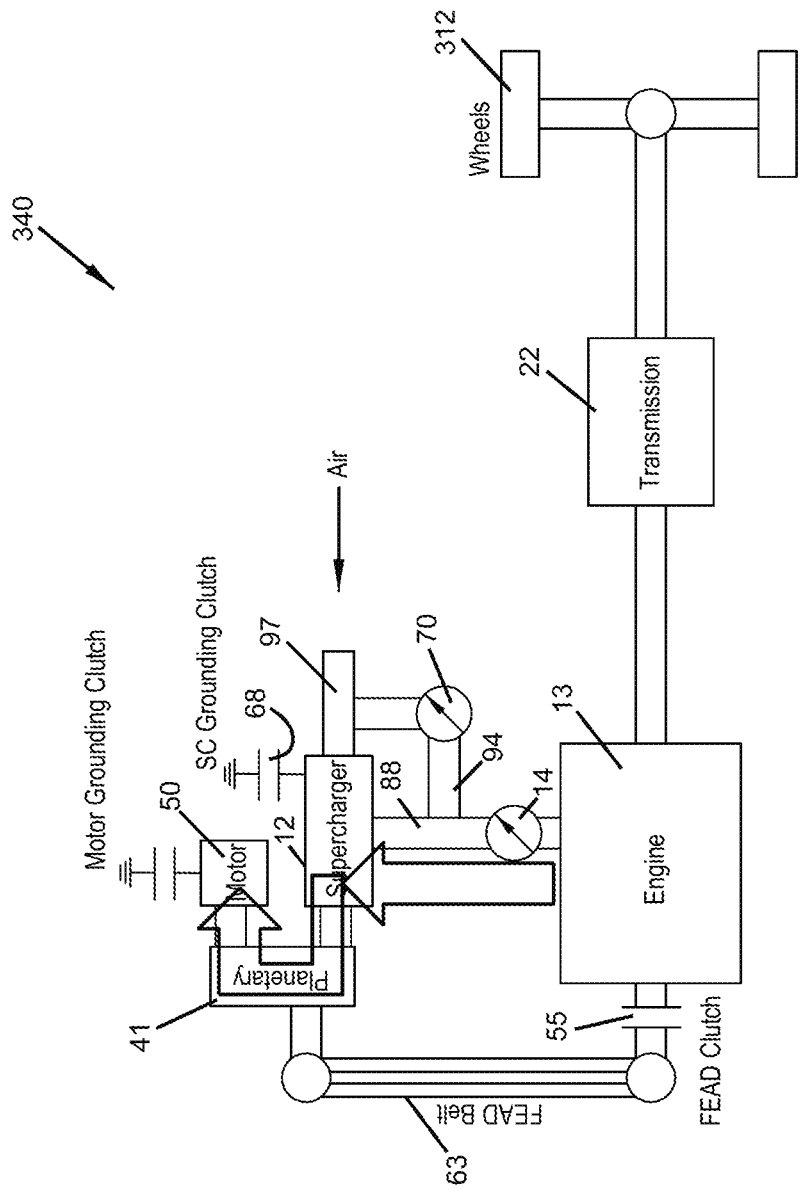
FIG. 29 is a schematic illustration in side view of the supercharger assembly and an engine assembly of FIG. 1 operating in a pumping regeneration mode.

Referring to FIG. 29, a "performance-impacting" operating mode, referred to as a pumping regeneration mode 340, is shown. This is similar to the throttling loss regeneration mode 310 described above, except that the electric motor-generator 50 applies a negative torque that adds resistance to the intake of air into the engine 13. This results in the engine 13 consuming additional fuel ("performance-impacting") to operate at a higher speed, with the torque generated by the supercharger 12 being applied to the electric motor-generator 50 to charge the energy storage device 64.

Figure 30:
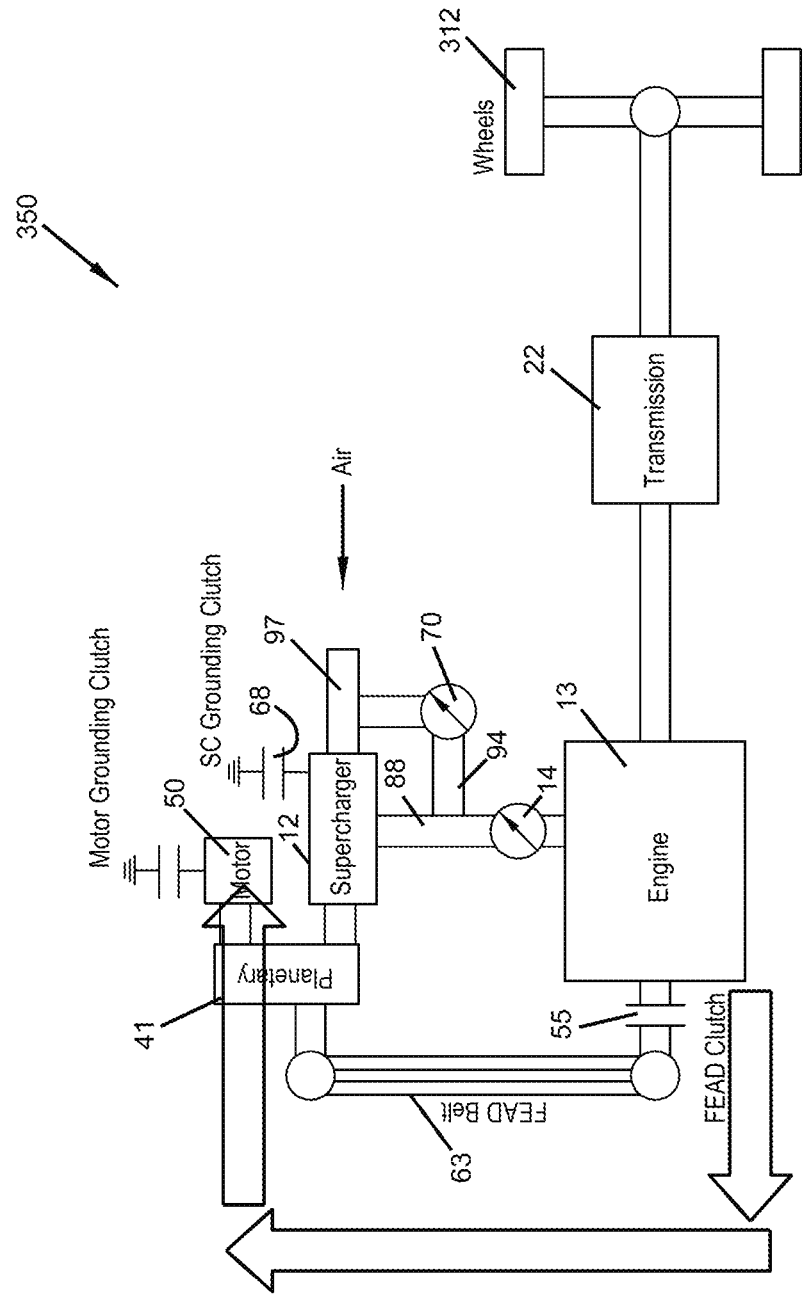
FIG. 30 is a schematic illustration in side view of the supercharger assembly and an engine assembly of FIG. 1 operating in an engine regeneration mode.

Finally, referring to FIG. 30, another "performance-impacting" operating mode, referred to as an engine regeneration mode 350, is shown. In this example, the supercharger 12 is stopped by the brake 68, and torque from the engine 13 is directed applied to the electric motor-generator 50 to regenerate the energy storage device 64. Fuel is consumed ("performance-impacting") by the engine 13 to provide the torque to the electric motor-generator 50 to charge the energy storage device 64.

In other examples, the operating modes can be further modified. For example, in an alternative example, when the state of charge exceeds a certain threshold (e.g., when the energy storage device 64 is at or near capacity), the supercharger is grounded, and the electric motor-generator 50 applies torque to the crankshaft to assist in the movement of the vehicle. This reduces the energy storage device 64 state of charge to allow the next brake or throttle regeneration event (see the examples provided above) to store energy that might otherwise be lost when the energy storage device 64 is too full. This can be advantageous so that regeneration opportunities are not lost if the energy storage device 64 is too full. Other configurations are possible.

Figure 31:
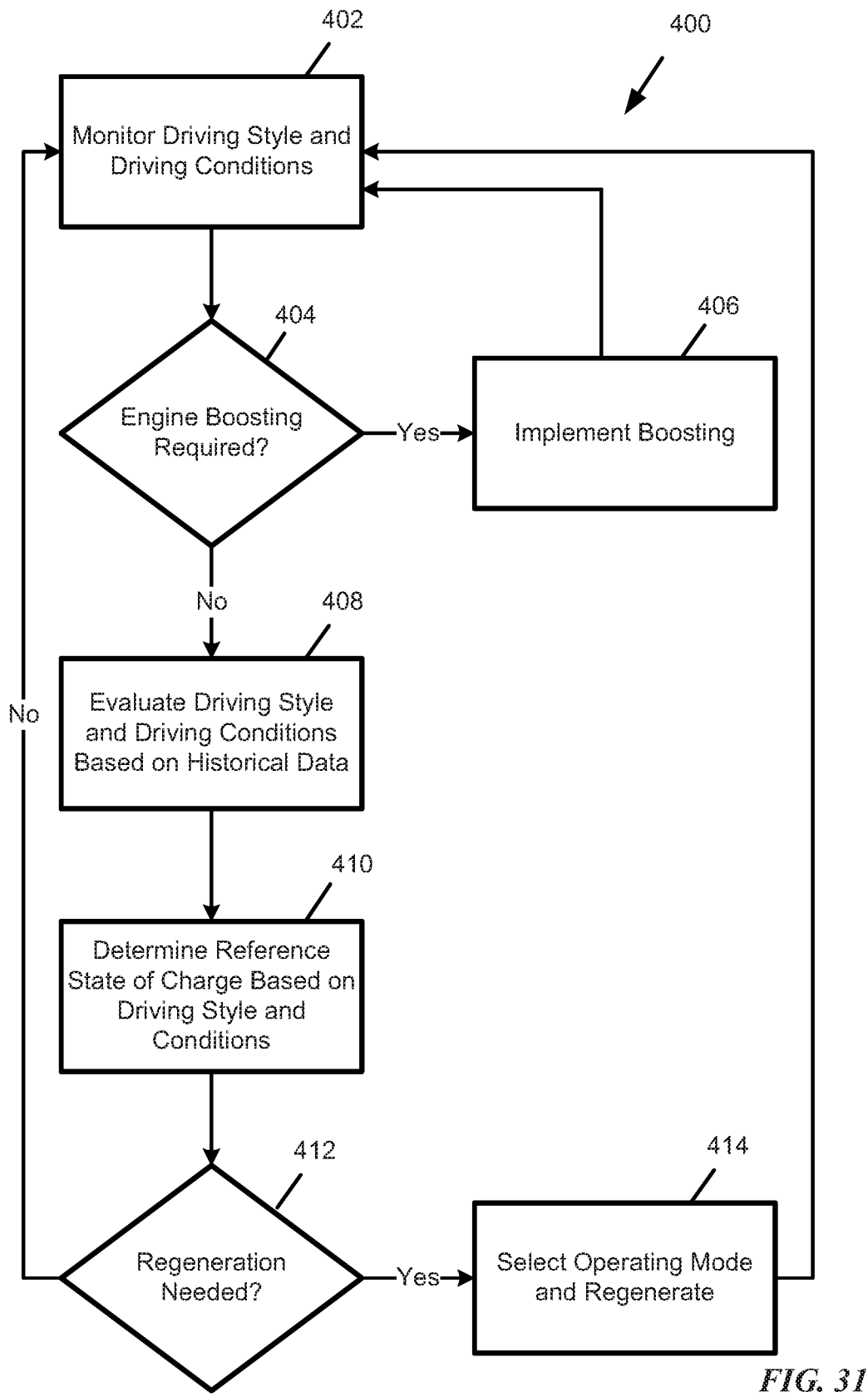
FIG. 31 is a flowchart illustration of an example method for determining the reference state of charge is shown.
Figure 32:
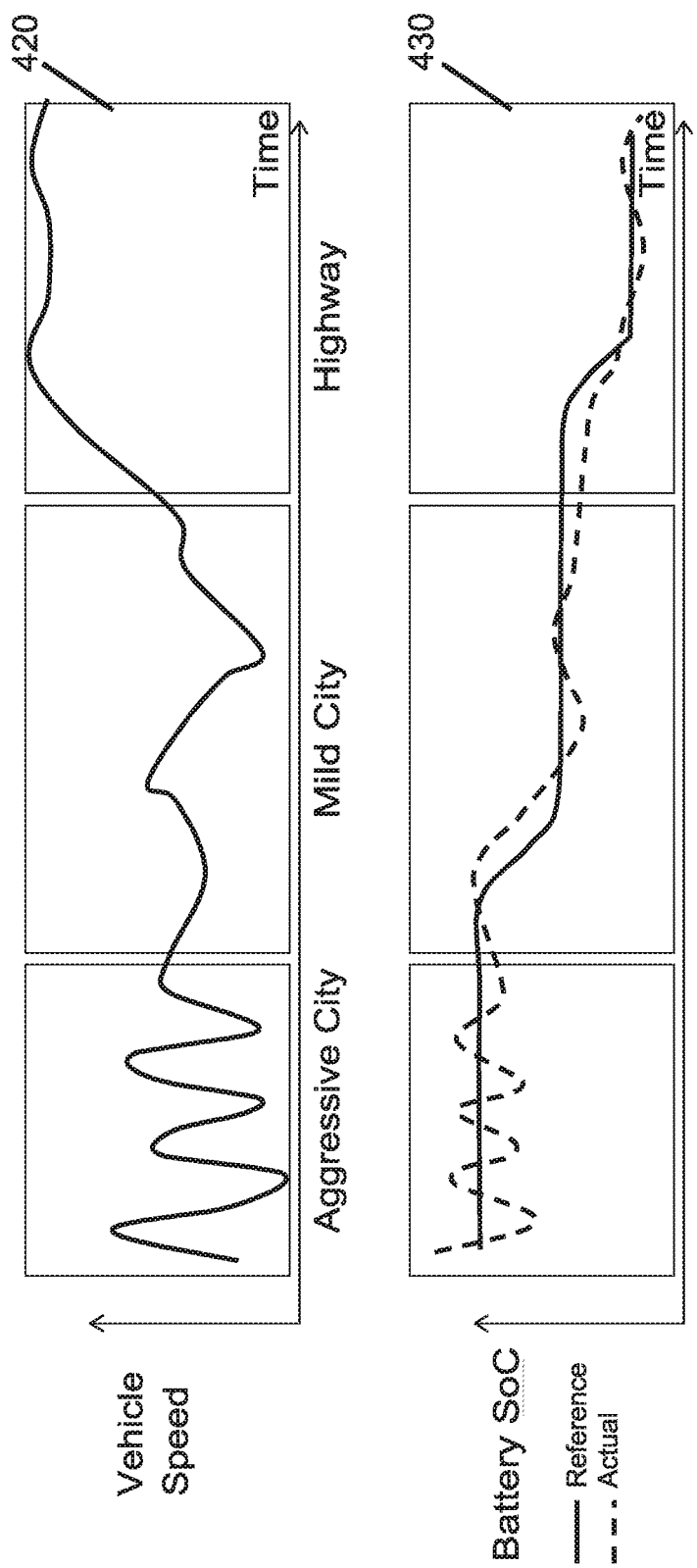
FIG. 32 is a graphical chart showing vehicle speed and state of charge over time.

Referring now to FIGS. 31-32, selection between the operating modes can be accomplished based upon a desire to optimize the charge of the energy storage device 64 while selecting between the nonperformance-impacting and performance-impacting operating modes to provide the regeneration, as described above.

The state of charge of the energy storage device 64 is generally the equivalent of a fuel gauge for the energy storage device 64, usually expressed in terms of a percentage from 0% to 100%. By determining a difference between a reference state of charge and the actual state of charge for the energy storage device 64, a deficit in charge may be identified. If a deficit does exist, then one or more of the operating modes can be selected to regenerate the energy storage device 64.

To determine this optimization, the desired reference state of charge is identified. Various aspects can be examined to determine the reference state of charge, such as driving characteristics like driving style (e.g., aggressive vs. passive), driving conditions (e.g., city, highway, etc.) and traffic information, as described further below.

Referring now to FIG. 31, an example method 400 for determining the reference state of charge is shown.

Initially, at operation 402, various aspects are monitored, including the driving style of the driver, the driving conditions and/or the traffic information.

For the driving style, a determination can be made regarding whether the driver is driving aggressively or passively. For example, if the driver is aggressive, additional charge may be needed to provide enhanced boosting. Historical information about the driving style can be stored for a period of time (e.g., for the past "x" seconds, where x is 30 seconds, 1 minute, 5 minutes, etc.) over the current driving session. In other examples, driving style can be learned over a plurality of driving sessions.

In addition, a determination of the current driving conditions is made, such as whether or not there is significant starting and stopping (e.g., indicative of city driving) or cruising at highway speeds. Such conditions as throttle, torque, speed, location (e.g., GPS) etc. can be examined. For example, if the current driving conditions indicate highway driving, less charge may be needed because less boosting is necessary to maintain the current speed. In another example, the driving conditions may indicate stop-and-go driving, which may make certain types of nonperformance-impacting regeneration modes (e.g., braking with supercharger locked regeneration mode 320) viable.

Further, the traffic information relates to future driving conditions. A determination of the traffic information is made, such as whether a vehicle is expected to slow down or stop at a particular location or between a certain route (e.g., whether a traffic signal is turning red as the vehicle passes the traffic signal) or whether a vehicle is expected to run on an uphill or a downhill ahead of the vehicle. The vehicle is equipped with sensors which are capable of communicating with transport infrastructure, such as road and highway networks that include hard structures (bridges and tunnels), signage and markings, and electrical systems (street lighting and traffic lights). Such communication can be implemented real-time and via various sensor systems, such as 3D maps, GPS, radar and/or live traffic feed. The traffic information may include traffic light timing, congestion levels, and geographical features.

The optimization of the charge of the energy storage device 64, as described herein, can also be combined with a system designed to eliminate needless acceleration by a driver and increase fuel efficiency. For example, sensors mounted in a vehicle communicate with transport infrastructure, determine various traffic conditions (such as grade, traffic density, and current and upcoming road speed limit) based on the communication, and inform the result to an algorithm. On the other hand, the algorithm reads a current driving condition (in this example, a driver throttle request) and compares this throttle request to the most fuel efficient throttle level for the determined traffic conditions. In the driver's throttle request is determined to be excessive, the system will send a torque limit command to the engine, thereby eliminate acceleration spikes and keep the vehicle speed more constant. Accordingly, the operation of this system can be monitored at operation 402 to perform the optimization of the charge of the energy storage device 64.

Next, at operation 404, a determination is made regarding whether or not boosting of the engine 13 by the supercharger 12 is currently needed. If so, control is passed to operation 406, and the boosting is provided. One example of an algorithm that is used to determine boosting is described below with reference to FIGS. 33-35. Regeneration of the energy storage device 64 is typically not provided during boosting.

Alternatively, if a determination is made that boosting of the engine 13 is not needed, control is instead passed to operation 408. At operation 408, the driving style, the driving conditions, and/or the traffic information are evaluated based upon the historical data and/or real-time communication with transport infrastructure or data center identified in operation 402. Next, at operation 410, a reference state of charge is selected based upon the driving style, driving conditions, and/or traffic information.

For example, referring now to FIG. 32, two graphs 420, 430 are shown. In the graph 420, the driving condition of speed is shown over time. The aggressive city driving has a signature of many starts and stops, while the mild city driving shows more even increases and decreases in speed. The highway driving shows a generally-smooth rate of speed over time. While speed is shown in graph 420, as noted above, many other driving conditions can also be examined.

The graph 430 shows, in solid line, the reference state of charge. This is calculated based upon the driving style, driving conditions, and/or traffic information. For example, with aggressive city driving, the reference state of charge is maintained at a relatively high level, since boosting using the energy storage device 64 to power the electric motor-generator 50 to drive the supercharger 12 to provide enhanced boosting levels to the engine 13 may be needed. The reference state of charge drops off to a medium level during mild driving, where some boost may be necessary, but not in significant amounts over a short period of time. With highway driving, the reference state of charge is at a low level, since speed is relatively constant and boosting is likely not needed. If traffic congestion is expected ahead of a vehicle, the reference state of charge is maintained at a relatively high level. If a traffic signal is expected to remain green as the vehicle passes the signal, the reference state of charge is maintained at a low level, since speed is relatively constant and boosting is likely not needed.

Referring again to FIG. 31, after the reference state of charge are identified, control is passed to operation 412, and a determination is made regarding whether or not regeneration is needed. This determination is generally based upon the difference between the reference state of charge and the actual state of charge (i.e., the current state of charge for the energy storage device 64).

For example, if the reference state of charge is higher than the actual state of charge, a deficit is identified. Once the deficit reaches a given threshold (e.g., 2%, 5%, 10%, etc.), control is passed from operation 412 to operation 414, and an operating mode for regeneration is selected. One or more of the nonperformance-impacting operating modes and/or performance-impacting modes can be selected.

Generally, the selection between the operating modes for regeneration is made based upon the driving style, driving conditions, and/or traffic information. For example, a preference is provided for nonperformance-impacting operating modes, particularly for driving styles, driving conditions, and/or traffic information indicating mild performance requirements. For aggressive driving styles, driving conditions, and/or traffic information, performance-impacting operating modes can be used. The type of regeneration can be modified over time as the driving styles, driving conditions, and/or traffic information change. In addition, regeneration can be delayed, if appropriate, to wait for a nonperformance-impacting operating mode to become available.

Once the regeneration of the energy storage device 64 causes the actual state of charge to exceed the reference state of charge (typically by a given threshold such as 2%, 5%, 10%, etc.), regeneration of the energy storage device 64 is stopped, and control is returned to operation 402.

Figure 19:
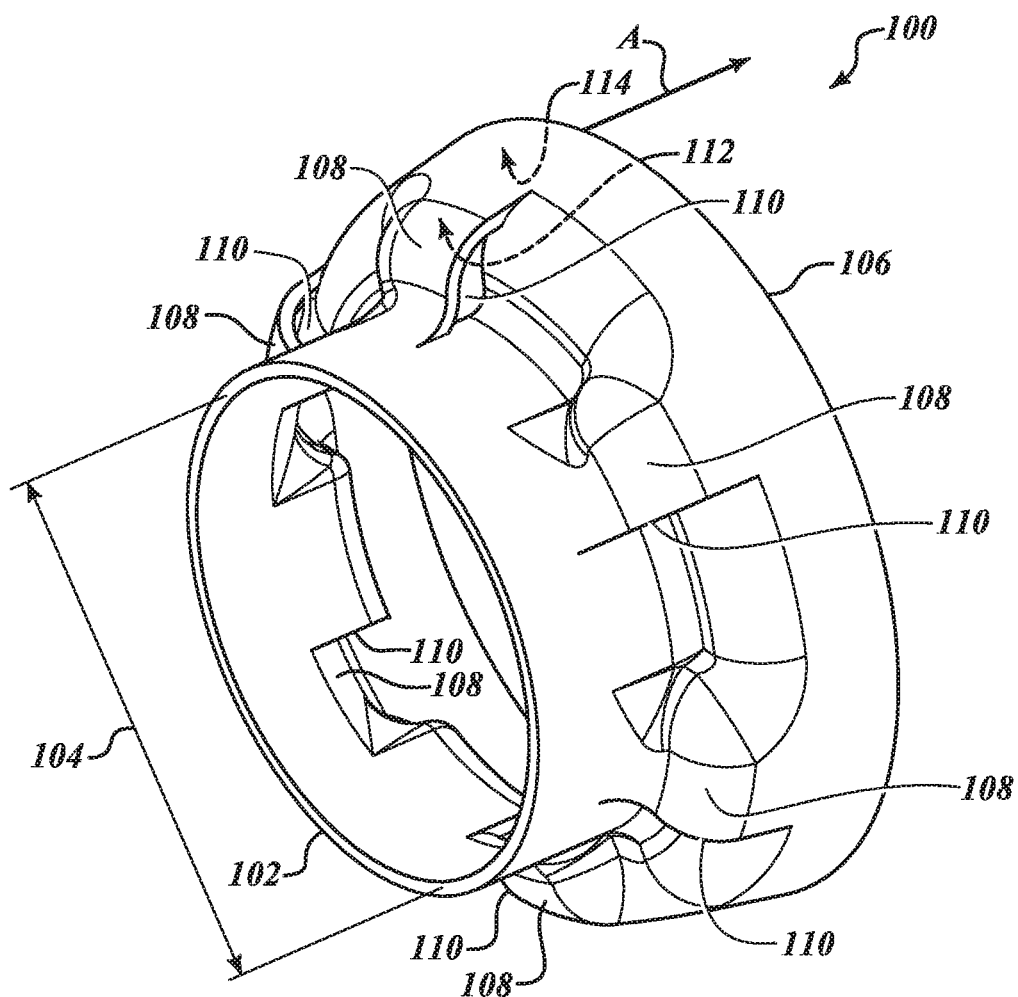
FIG. 19 is a schematic perspective illustration of an oil slinger mounted to a pulley shaft in FIG. 3.

Referring again to FIG. 1, an oil slinger 100 is mounted to the pulley shaft 61 to rotate with the pulley shaft 61. FIG. 19 is a perspective view of the oil slinger 100 disconnected from the pulley shaft 61. The oil slinger 100 is an annular member with a first end 102 that has a first inner diameter 104 configured to fit to the outer surface of the pulley shaft 61. A second end 106 has a larger diameter so that the oil slinger 100 fans out from the pulley shaft 61 toward the second end 106. The oil slinger 100 is positioned on the pulley shaft 61 so that the second end 106 faces the planetary gearing arrangement 41, as best shown in FIG. 3. FIG. 19 shows that the oil slinger 100 is formed with a series of scooped portions 108 about a periphery of the oil slinger 100 generally midway between the ends 102, 106. Each of the scooped portions 108 has an opening 110, with each of the openings 110 facing the same direction of rotation. Each scooped portion 108 tapers in an axial direction between the larger end 106 and the smaller end 102. When the pulley shaft 61 rotates in a clockwise direction, the oil slinger 100 also rotates in a clockwise direction and oil mist within the gear cover portion 95 will enter through the openings 110 and be captured by the scooped portions 108. The oil mist will contact the inner surface 112 of the scooped portion 108. Rotation of the oil slinger 100 will cause the oil mist to travel toward the end 106 along an inner surface 114 of the oil slinger 100 and be propelled from the oil slinger 100 in the direction of arrow A. The oil will be strewn generally toward the planetary gear set 41 for lubrication of the planetary gear set 41.

FIG. 2 shows the supercharger assembly 11 with the various portions of the housing assembly 80 attached to one another. The inlet pipe 97 has openings that align with openings 113 of the inlet cover portion 82, shown in FIG. 18, so that fasteners 115 can be used to attach the inlet pipe 97 to the inlet cover portion 82 over the air inlet 84. As used herein, a fastener can be any suitable component used to attach two adjacent components, such as a bolt, a screw, or other suitable fastener.

FIG. 3 shows an extension portion 116 of the first shaft 30 that has a toothed end portion 118. A rotating member 120 with a flange 122 is splined to the toothed end portion 118 and is supported at the inlet cover portion 82 by a bearing 124 to be rotatable relative to the inlet cover portion 82. The extension portion 116, toothed end portion 118, rotating member 120 and flange 122 are within the cavity 69. An electromagnetic brake 68 is selectively actuatable by the controller 65 by wires (not shown) that extend through a wire access opening 126 shown in FIG. 18 to provide electric energy used to actuate a coil 128 within the brake 68 to hold the flange 122 stationary relative to the inlet cover portion 82 via electromagnetic attraction. The coil 128 is shown in FIG. 3 not in FIG. 18. A brake cover 130 is attached to the inlet cover portion 82 with fasteners 132 that extend through openings 134 in the inlet cover portion 82. As discussed with respect to FIG. 1, the inlet cover portion 82 also defines a portion 92 of the bypass passage 94. The portion 92 is in fluid communication with the inlet 84 and extends through the inlet cover portion 82. The portion 92 is shown over the brake cavity 69 and extending out of a bottom of the inlet cover portion 82 in FIG. 18. For illustrative purposes, portion 92 is shown only above the brake 68 in FIG. 1. Any suitable orientation of the portion 92 in the inlet cover portion 82 may be used. The bypass passage 94 is connected to the inlet cover portion 82 to be in communication with the portion 92 alternately bypass passage 94 may be attached upstream from inlet cover 82 and inlet pipe 97 via a plumbing tee or the like.

FIG. 2 shows a fastener 135 that is used to attach the inlet cover portion 82 to the rotor housing portion 90. Although only one fastener 135 is shown, multiple additional fasteners 135 can be placed at various positions around the interface of the rotor housing 90 and the inlet cover portion 82. FIG. 3 shows that when the inlet cover portion 82 is attached to the rotor housing portion 90, the first shaft 30 extends from the rotor housing portion 90 into the inlet cover portion 82.

Figure 5:
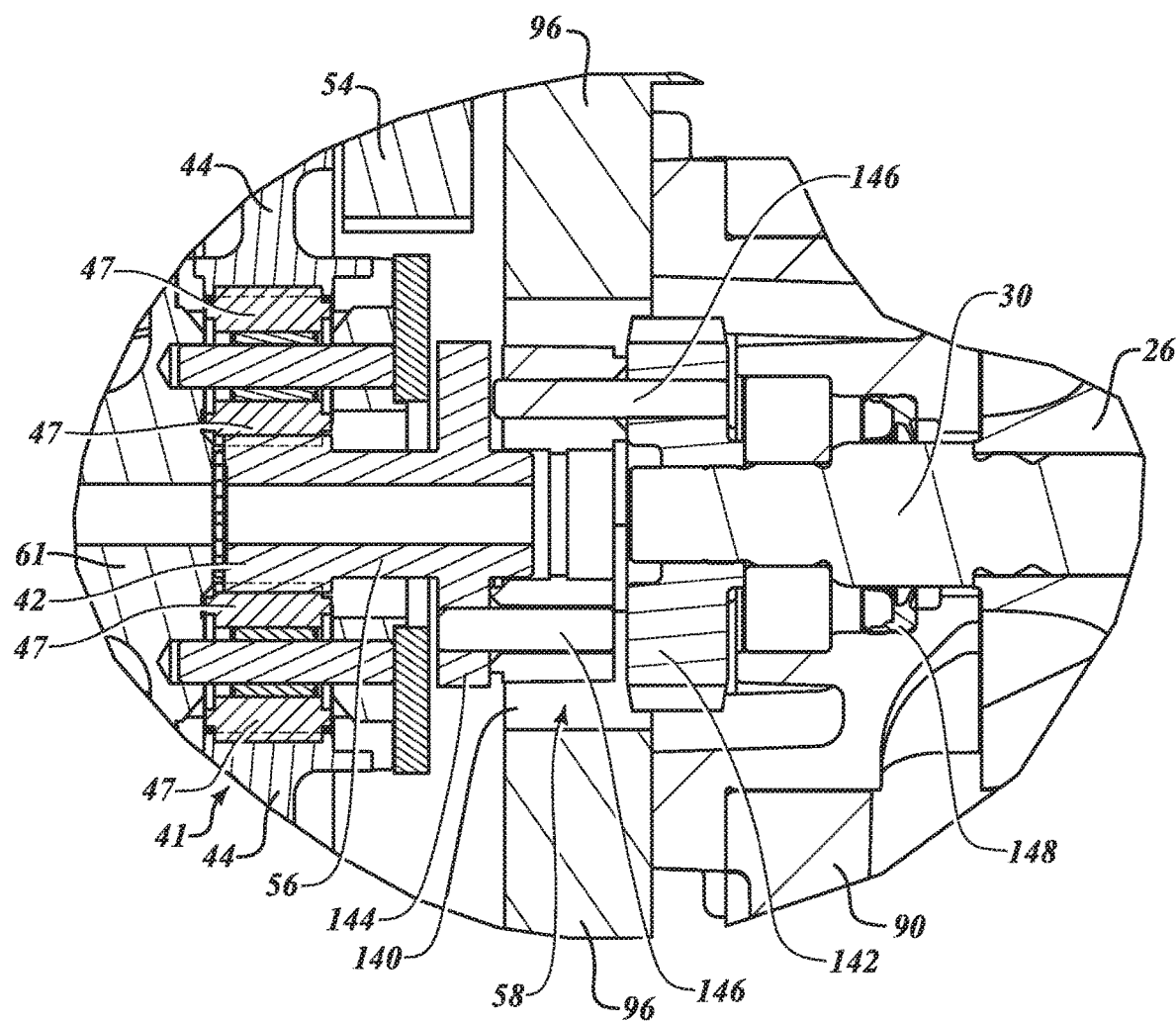
FIG. 5 is a schematic illustration of a portion of the supercharger at the area indicated in FIG. 4.

FIG. 5 is a closer view of a portion of the supercharger assembly 11 that shows the planetary gearing arrangement 41 and its operative connection to the first shaft 30. Specifically, the coupling member 58 is positioned within an opening 140 of the motor housing portion 96. The coupling member 58 includes a first member 142 fit to the first shaft 30 and pinned to a flange 144 of the shaft 56 with circumferentially positioned pins 146. The coupling member 58 absorbs torsional vibrations that may be caused by pressure pulsation emanating from the supercharger assembly 11 on shaft 30 or engine pulsation from shaft 61. A seal 148 seals the first shaft 30 to the rotor housing 90 to prevent leakage of air from within the rotor housing 90.

Figure 6:
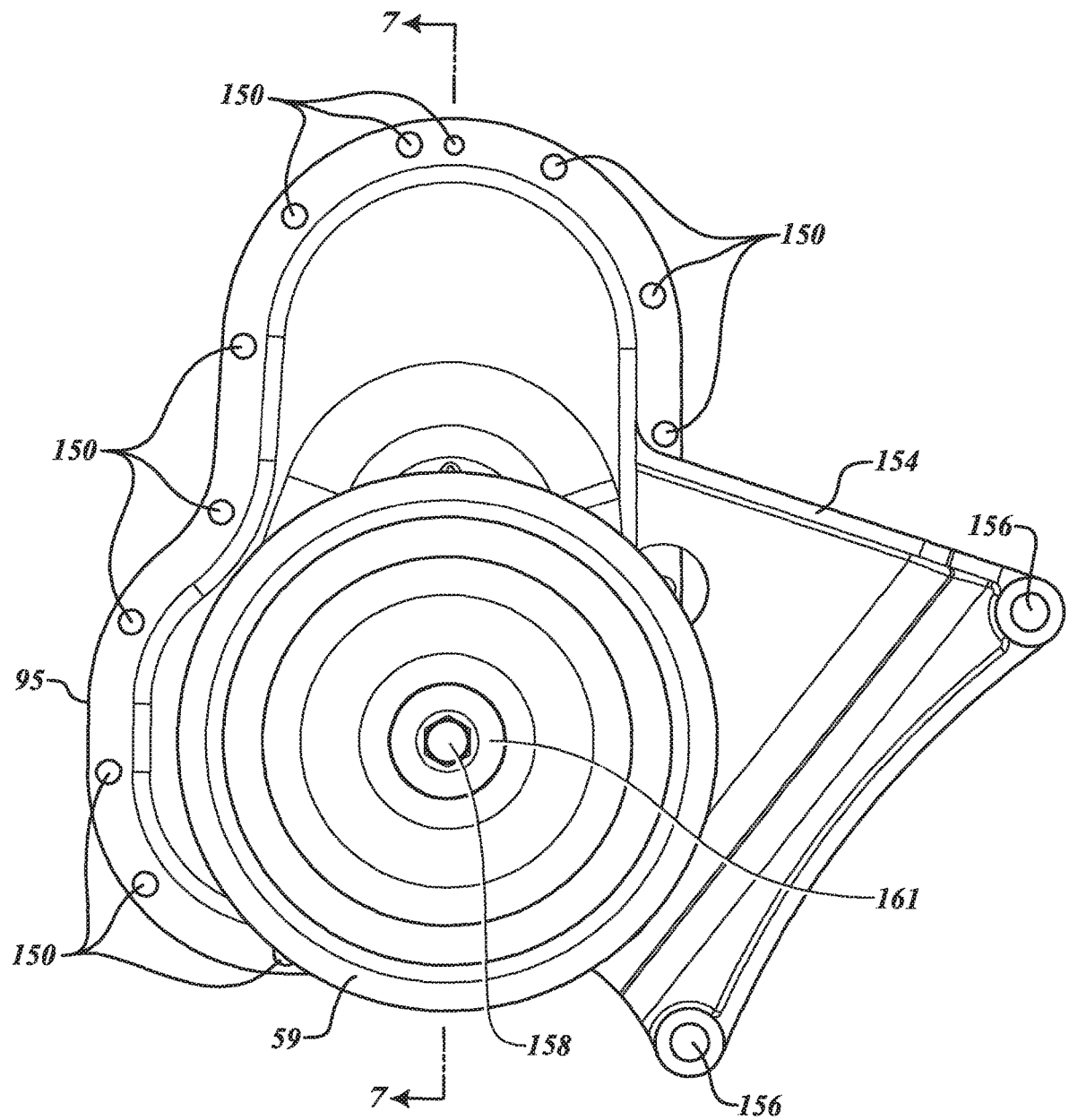
FIG. 6 is a schematic illustration in an end view of a gear cover portion of the housing assembly.
Figure 7:
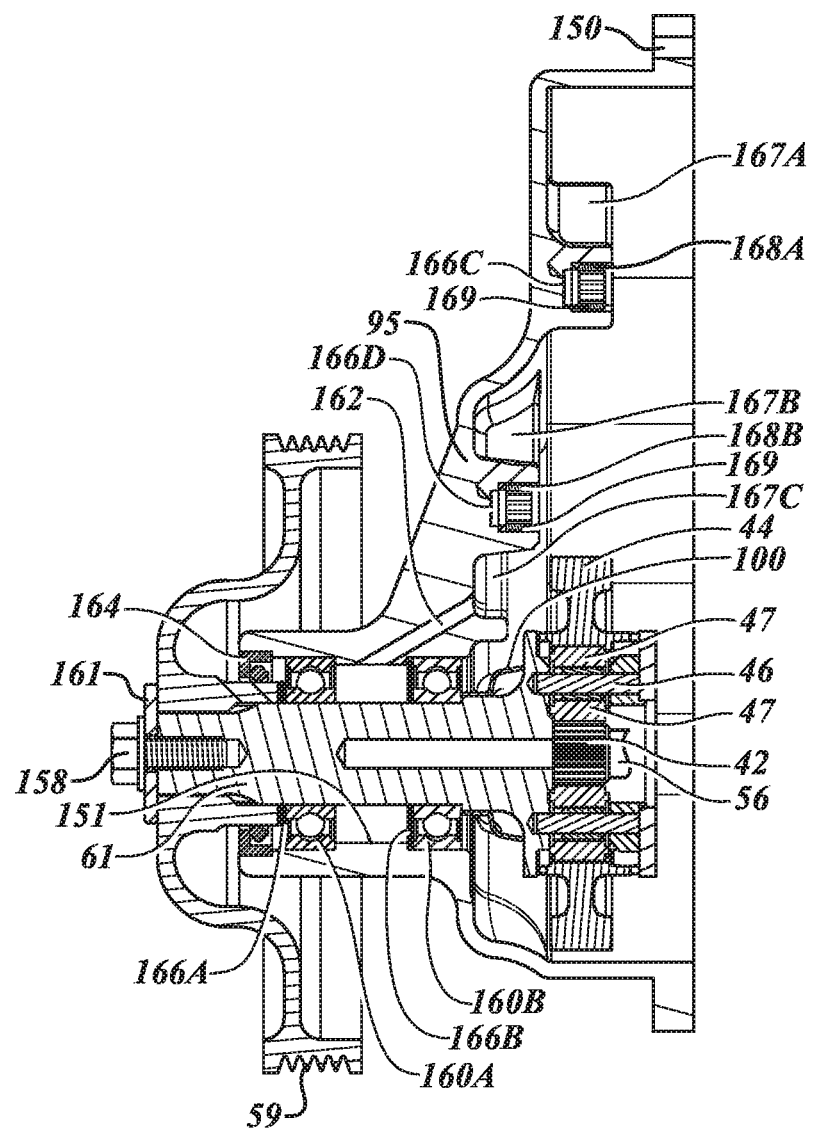
FIG. 7 is a schematic illustration in cross-sectional view taken at lines 7-7 in FIG. 6 of a portion of the supercharger assembly within the gear cover portion.
Figure 8:
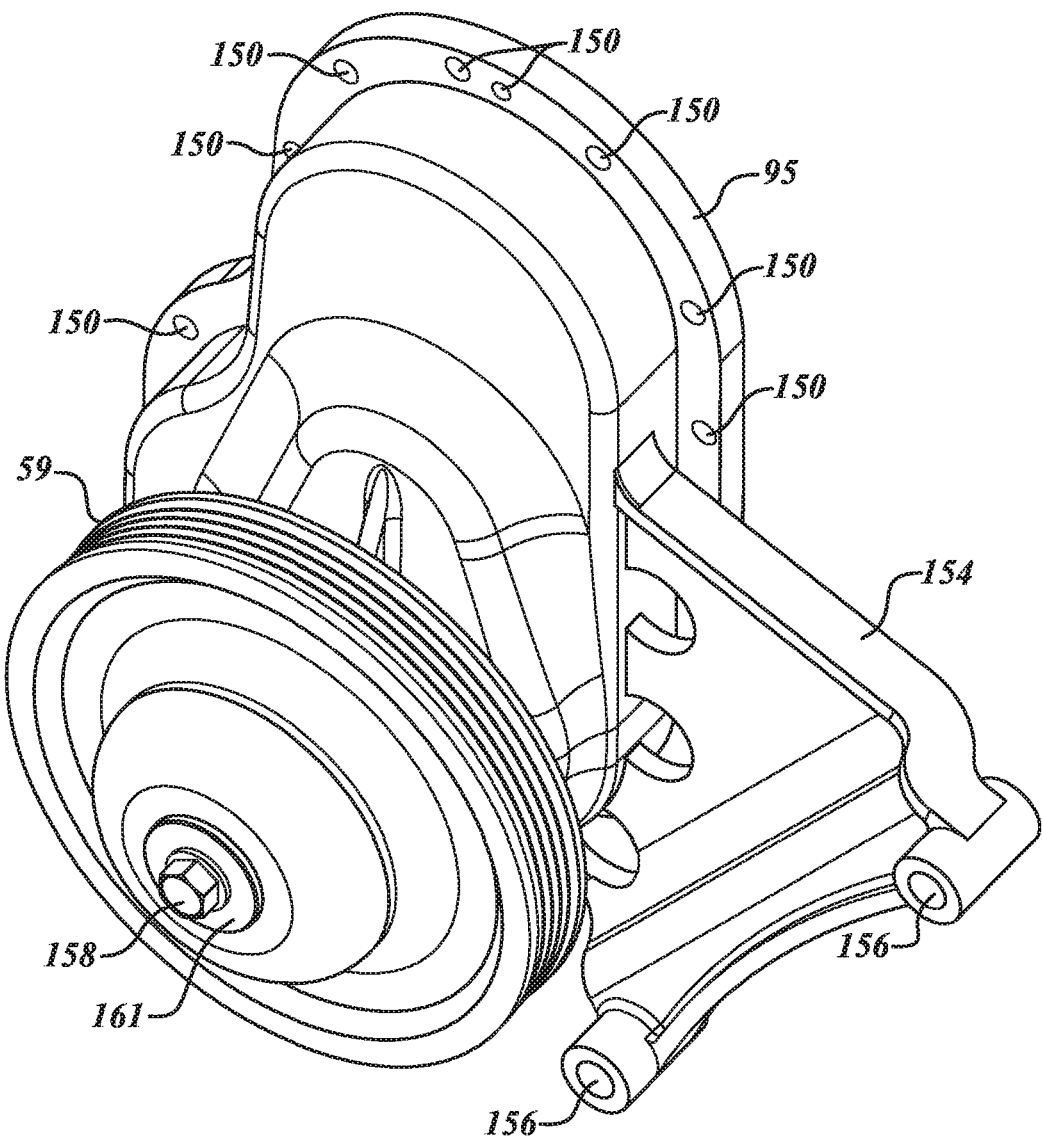
FIG. 8 is a schematic perspective illustration of the gear cover portion.
Figure 13:
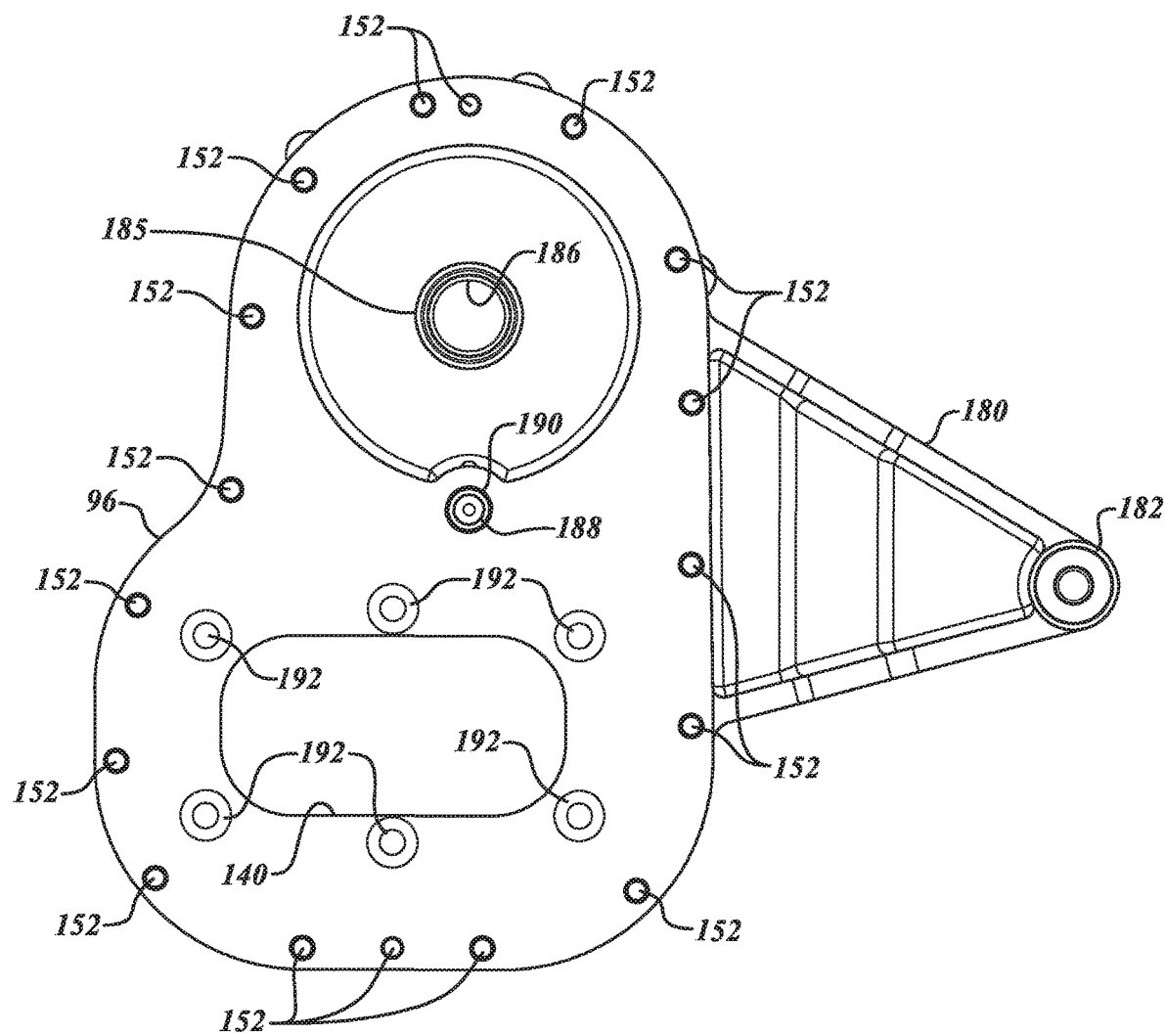
FIG. 13 is a schematic illustration in end view of the motor housing portion.

FIGS. 6-8 show the gear cover portion 95 including a pattern of fastener openings 150 that match a pattern of fastener openings 152 on the motor cover portion 96, shown in FIG. 13. Fasteners 157 (two shown in FIG. 4) are used to attach the gear cover portion 95 to the motor housing portion 96 through the aligned openings 150, 152. Some of the fastener openings 150 are obscured in FIG. 6 by a mounting flange 154 of the gear cover portion 95. The mounting flange 154 has fastener openings 156 though which fasteners are placed to mount the gear cover portion 95, and thereby the entire supercharger assembly 11, to the engine 13 of FIG. 1.

The pulley 59 is shown with a hex screw 158 extending through an opening in the pulley 59 to mount the pulley 59 to the pulley shaft 61 (shown in FIG. 4). The pulley shaft 61 extends through an opening in the gear cover portion 95. A washer 161 is positioned between the hex screw 158 and the pulley shaft 61. Bearings 160A, 160B shown in FIG. 4 permit the pulley shaft 61 and pulley 59 to rotate relative to the gear cover portion 95. At least one passage 162 though the gear cover portion 95 directs lubricating fluid through the gear cover portion 95 to the bearings 160A, 160B. A seal 164 is positioned between the gear cover portion 95 and the pulley 59 at an opening in the gear cover portion 95 through which the shaft 61 extends. As best shown in FIG. 7, a wave disc spring 166A is positioned between the pulley 59 and the bearing 160A to stop the inner bearing race of bearing 160A from spinning relative to shaft 61 and manage stack-up tolerances. Another wave disc spring 166B is positioned between the bearing 160B and a ledge of the gear cover portion 95 to prevent the outer race of bearing 160B from spinning in gear cover housing 95. Disc springs 166C, 166D are also used between the gear cover portion 95 and motor gear 53 shaft and idler gear 54 shaft ends which ride on needle bearings 168A and 168B housed in recesses 169 of the gear cover portion 95. These disc springs provide wear surfaces and manage tolerance stack-up. Needle bearing 168A allows gear 53 to rotate relative to and extend through the motor housing portion 96. Gear 53 is splined to the motor shaft 52 (shown in FIG. 4). Needle bearings 168B and 188 allows the gear 54 to rotate relative to the gear housing portion 95 and motor housing portion 96.

Figure 20:
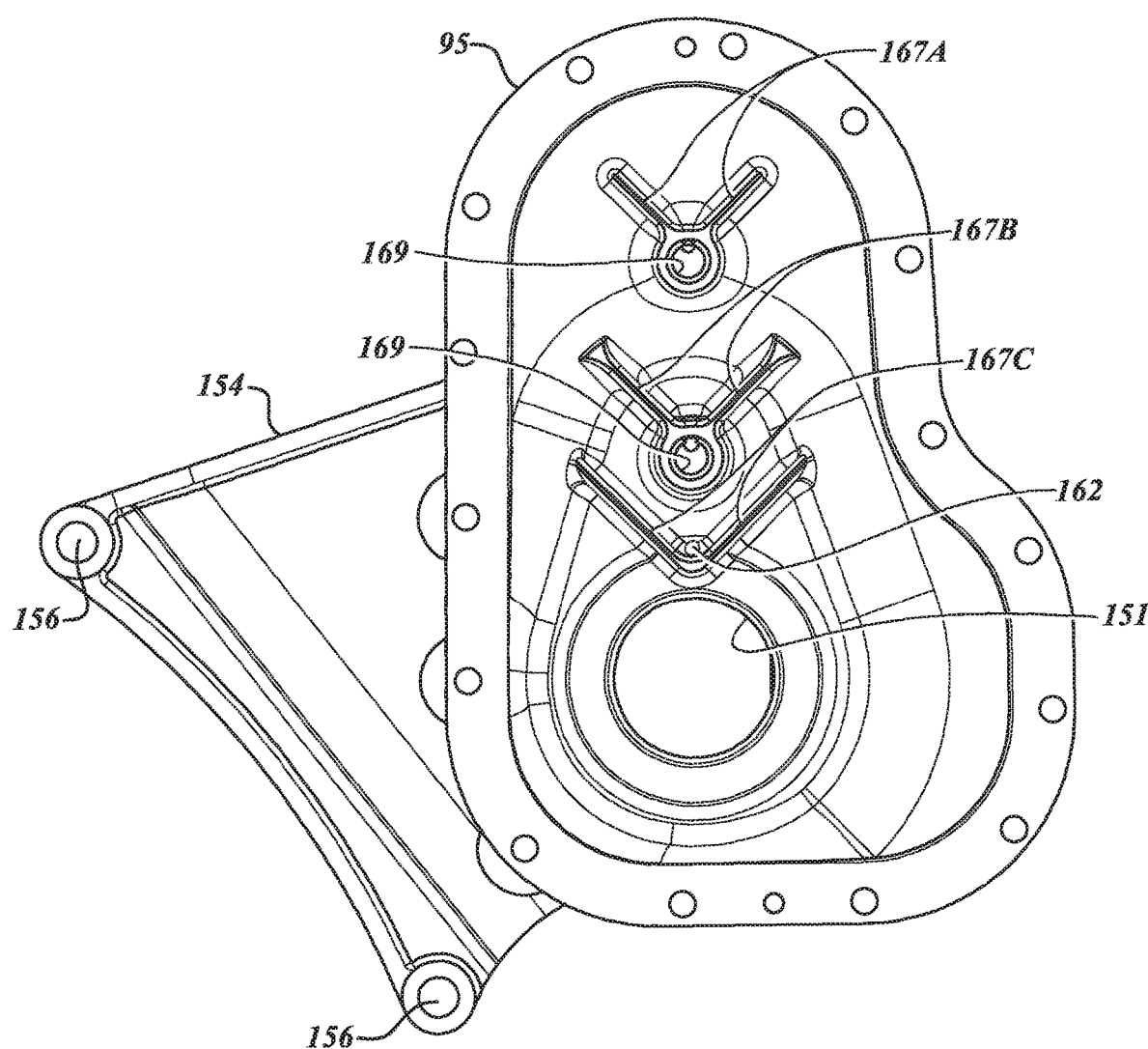
FIG. 20 is a schematic illustration in an opposite end view of the gear cover portion than shown in FIG. 6.

FIG. 20 shows that the gear cover portion 95 has ribs 167A, 167B, 167C that strategically collect and direct oil within the gear cover portion 95. Ribs 167A and 167B generally form a V shape above the recesses 169 in which the needle bearings 168A, 168B are housed. Oil droplets within the gear cover portion 95 will collect on the ribs 167A, 167B and drain to the recesses 169 to lubricate the bearings 168A, 168B. Rib 167C forms a V shape that strategically directs oil in the gear cover portion 95 to the passage 162. Oil drains through the passage 162 to a space in the opening 151 between the bearings 160A, 160B to lubricate the bearings 160A, 160B.

Figure 9:
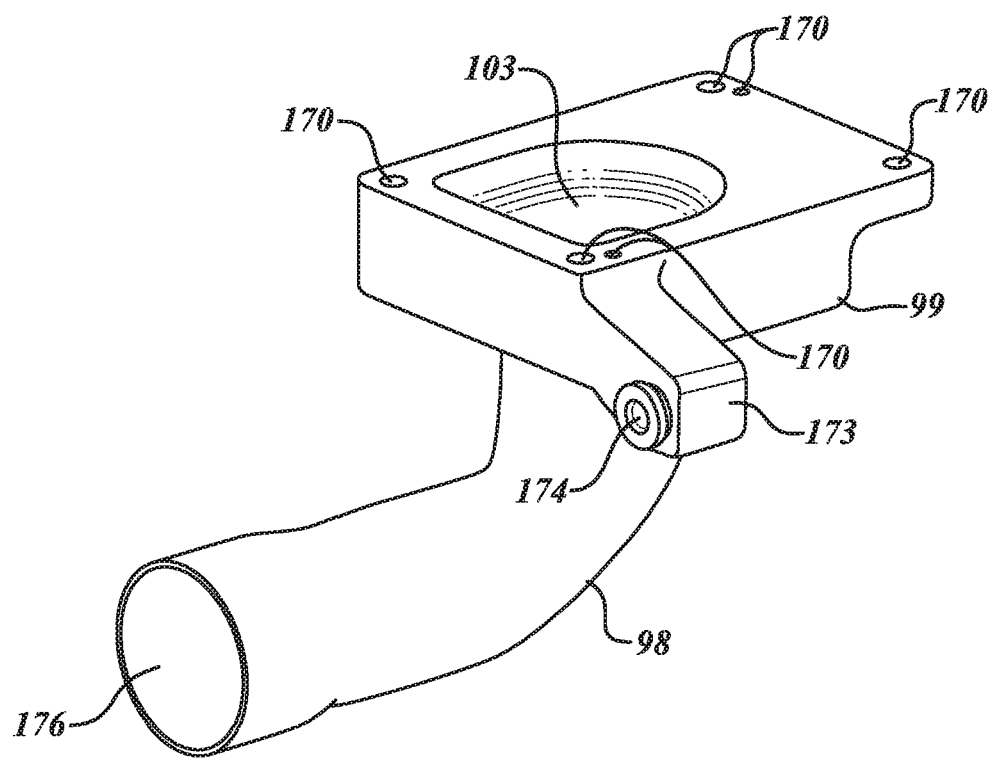
FIG. 9 is a schematic perspective illustration of an outlet housing and outlet pipe of the housing assembly.
Figure 10:
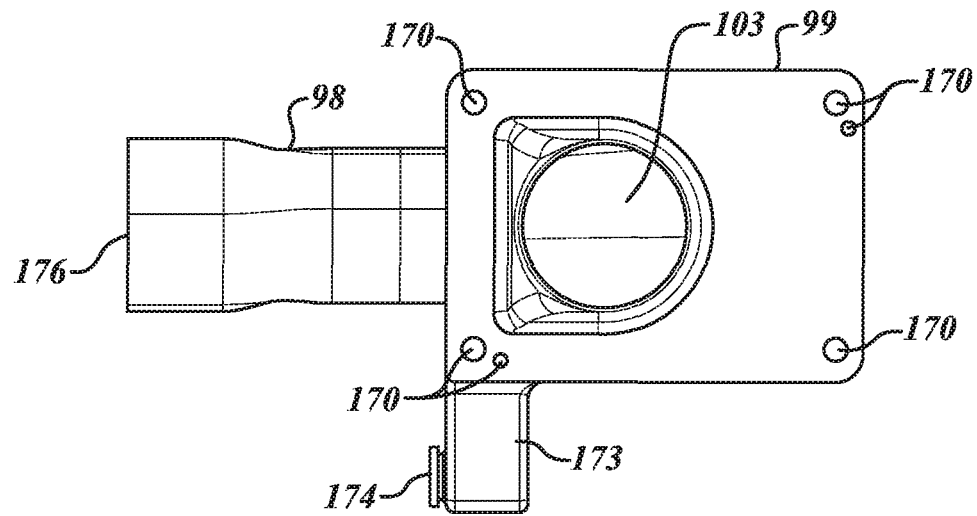
FIG. 10 is a schematic plan view illustration of the outlet housing and outlet pipe of the housing assembly.
Figure 11:
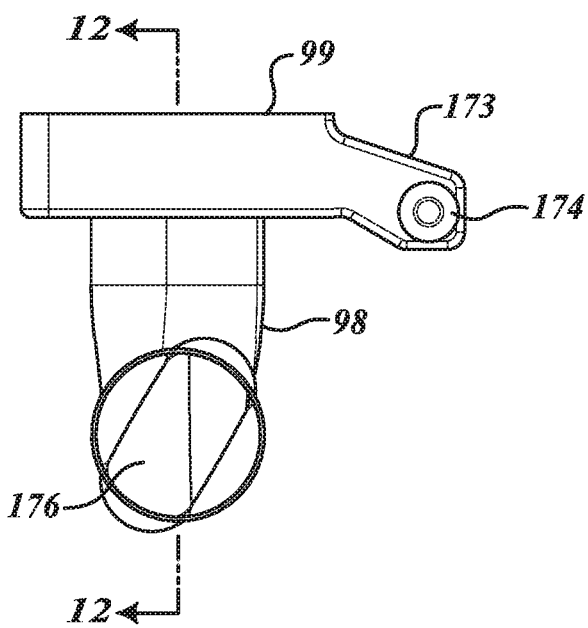
FIG. 11 is a schematic illustration in side view of the outlet housing and outlet pipe of the housing assembly.
Figure 12:
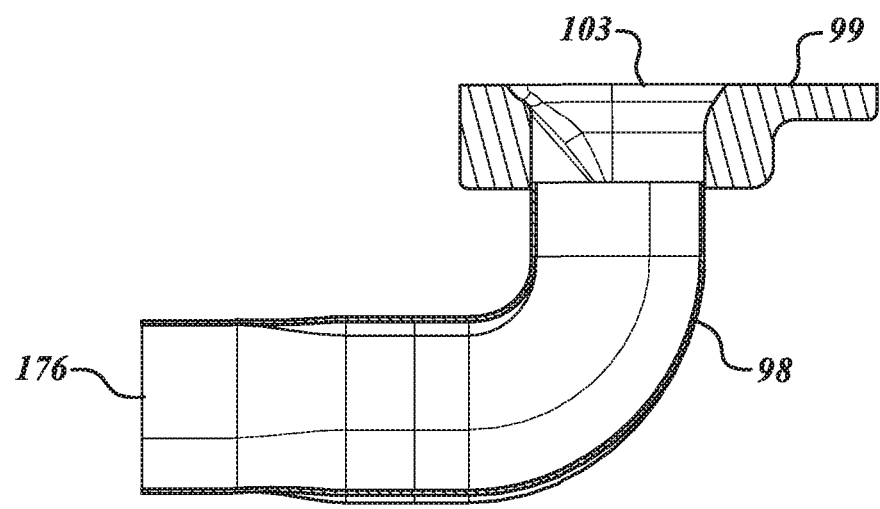
FIG. 12 is a schematic illustration in cross sectional view of the outlet housing and outlet pipe taken at the lines 12-12 in FIG. 11.
Figure 21:
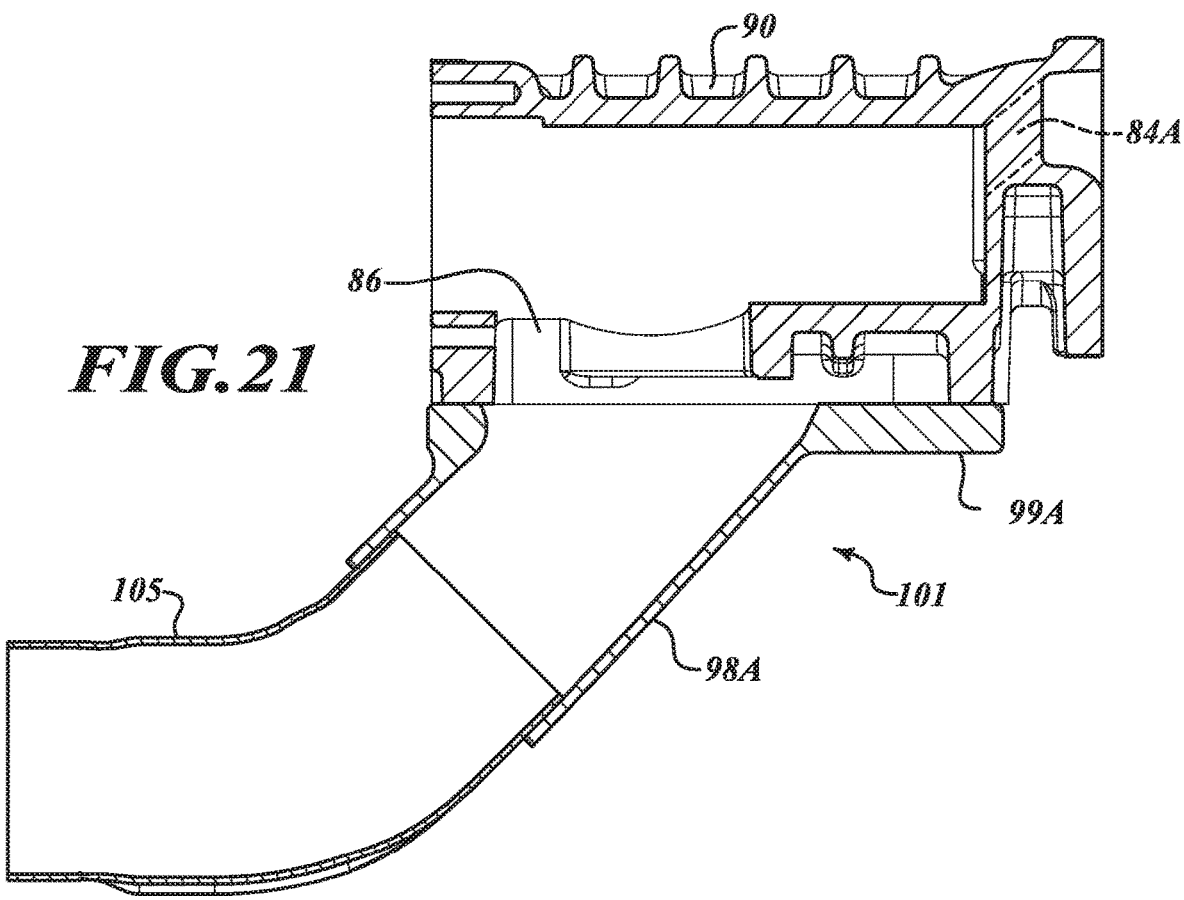
FIG. 21 is a schematic cross-sectional illustration of the rotor housing portion with an outlet component having an outlet housing and an outlet pipe in accordance with another aspect of the present teachings.
Figure 22:
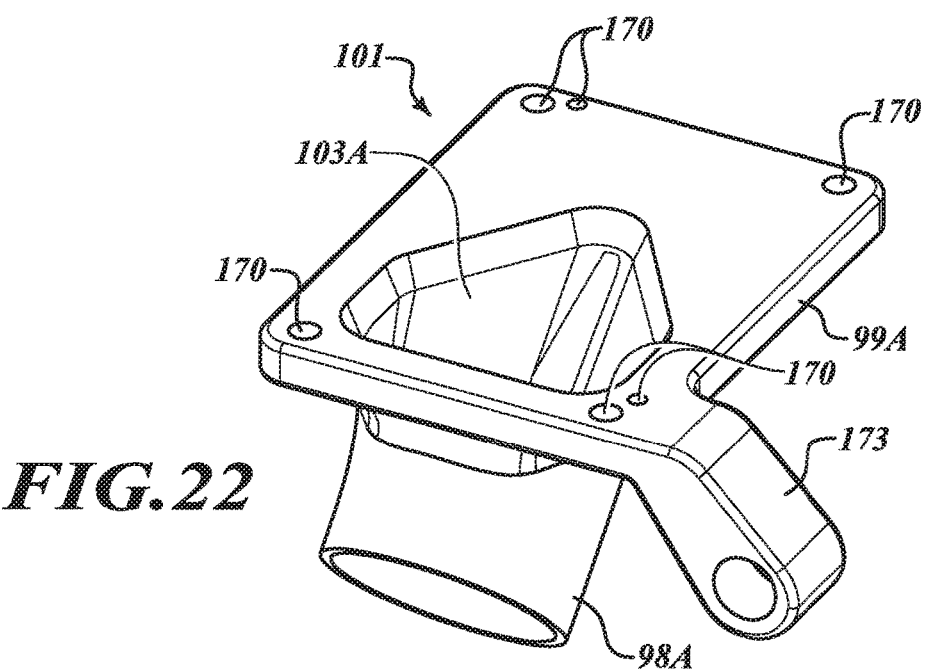
FIG. 22 is a schematic perspective illustration of the outlet component with the outlet housing and outlet pipe of FIG. 21.

FIGS. 9-12 show the outlet housing 99 with the outlet pipe 98 extending from the outlet housing 99. In this example, the outlet pipe 98 and outlet housing 99 are welded together. In the example of FIGS. 21-22, an outlet housing 99A and an outlet pipe 98A are a unitary, one-piece outlet component 101. The outlet housing 99 of FIG. 9 has a pattern of fastener openings 170 that matches a pattern of fastener openings 177 (see FIG. 23) at the rotor housing portion 90 around the air outlet 86. One fastener 172 is shown in FIG. 2 connecting the outlet housing 99 to the rotor housing 90. FIG. 9 shows a flange 173 with an opening 174 that can be used to mount the outlet housing 99 to the engine 13. An opening 103 of the outlet housing 99 is in fluid communication with the air outlet 86 of the rotor housing portion 90. The outlet 176 of the outlet pipe 98 feeds into the throttle body 16 of FIG. 1.

Figure 14:
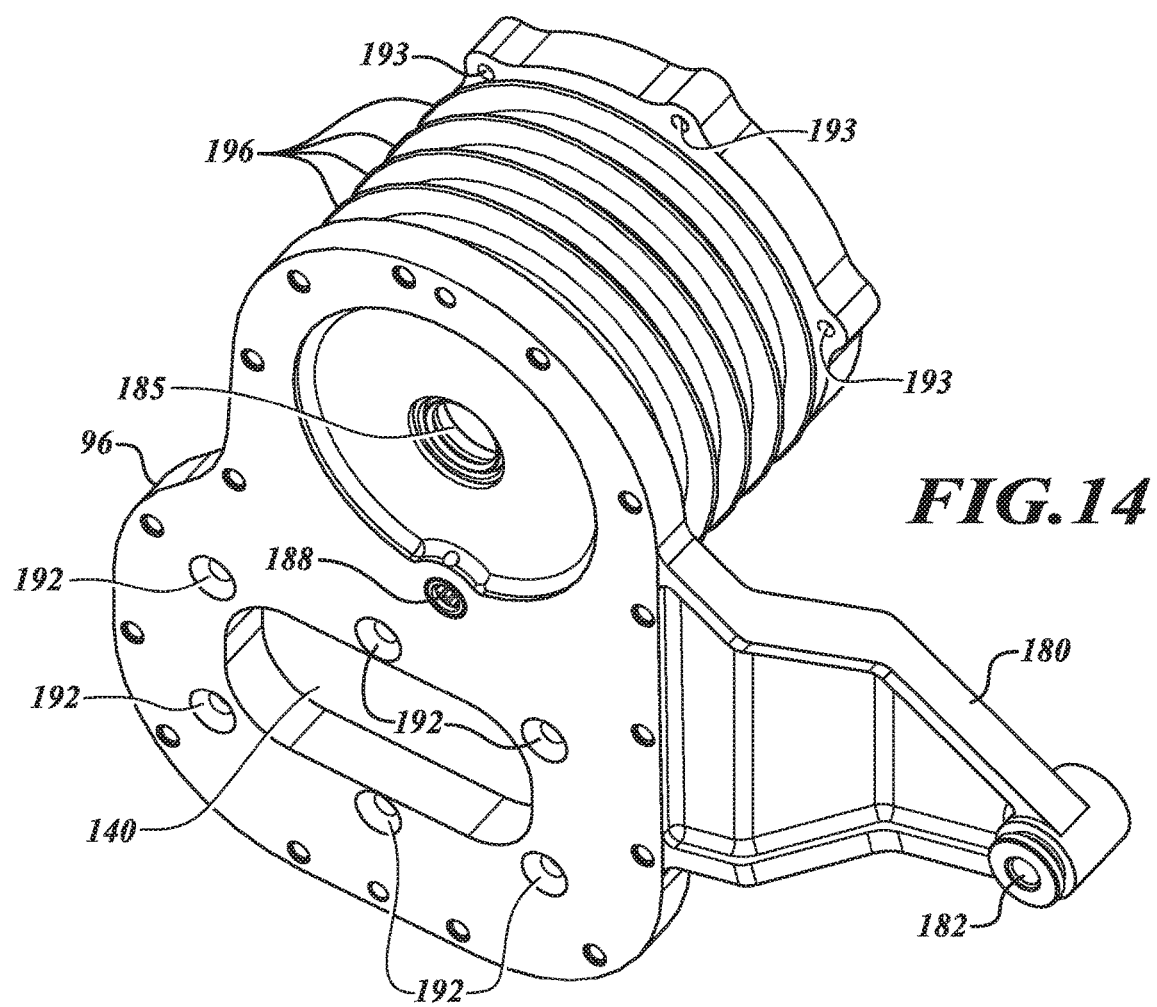
FIG. 14 is a schematic perspective illustration of the motor housing portion.
Figure 15:
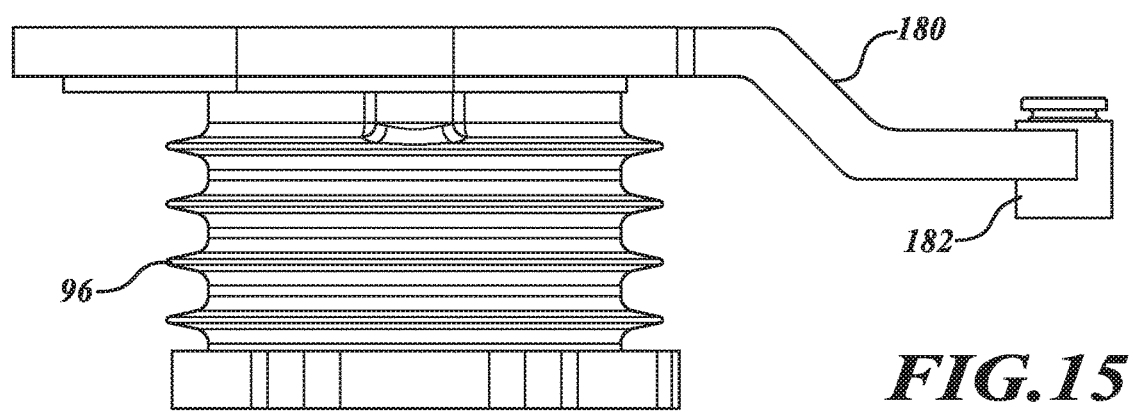
FIG. 15 is a schematic illustration in plan view of the motor housing portion.

FIGS. 13-15 show the motor housing 96 with a mounting flange 180 with an opening 182 by which the motor housing 96 can be mounted to the engine 13 of FIG. 1. The mounting flange 180 extends in the same direction as the flange 154 of the gear cover portion 95. A seal 185 is positioned in an opening 186 of the motor housing 96 at which the motor shaft 52 is splined to the first gear member 53, as shown in FIG. 4. A needle bearing 188 is positioned in another opening 190 in the motor housing portion 96 at which the second gear member 54 is supported for rotation. The rotor housing 90 can be fastened to the motor housing portion 96 around the opening 140 with fasteners that extend through stepped openings 192. FIG. 14 shows that the motor housing portion 96 has openings 193 around a flange at which the motor controller housing 194 of FIG. 4 is mounted by fasteners extending through the openings 193. The motor cover portion 96 includes integral cooling fins 196 for cooling the motor-generator 50.

Figure 16:
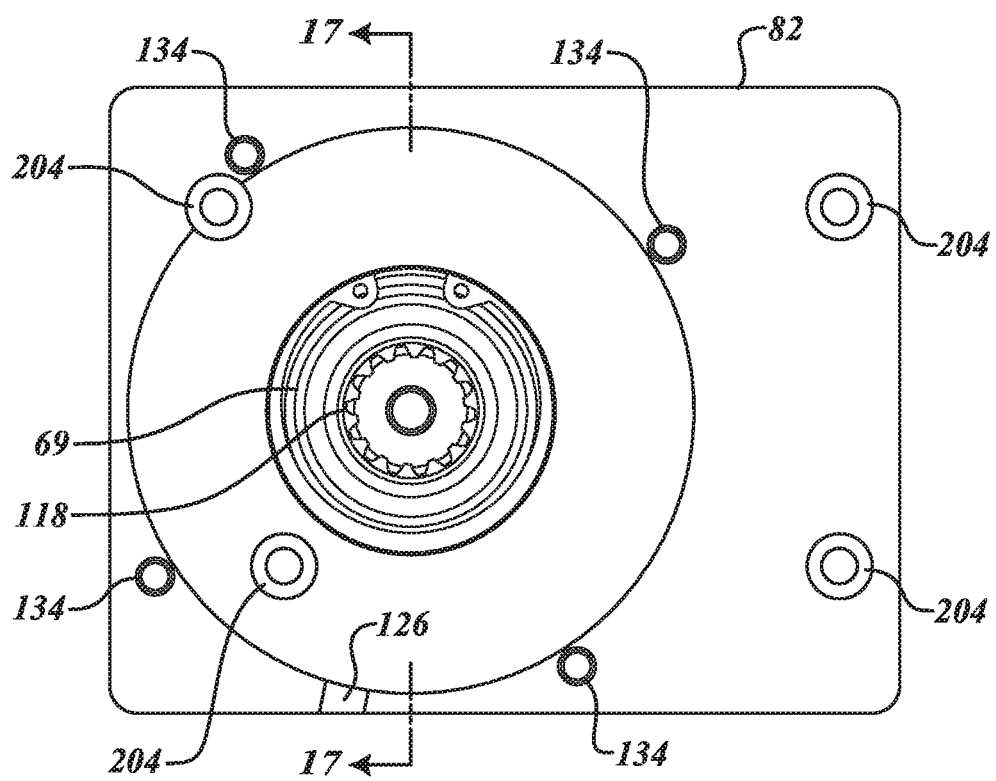
FIG. 16 is a schematic illustration in end view of an inlet cover portion of the housing forming a cavity for a brake.
Figure 17:
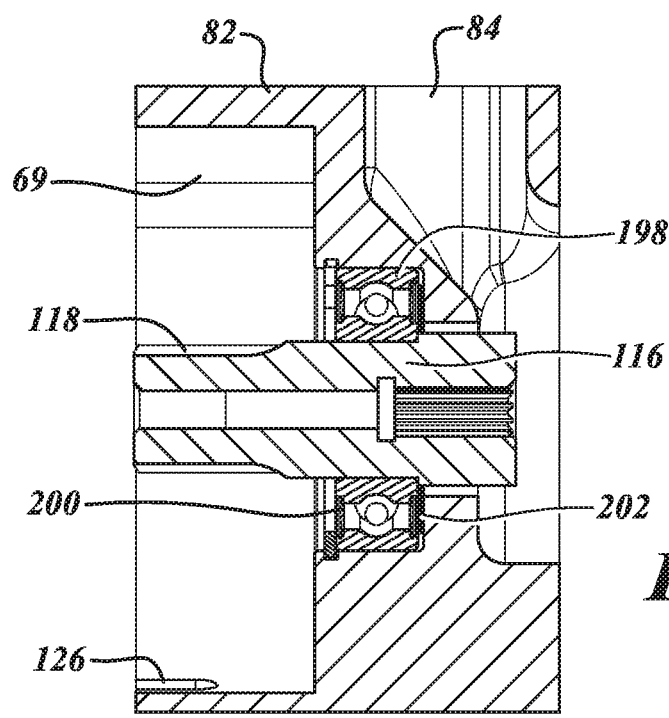
FIG. 17 is a schematic illustration in cross-sectional view of the inlet cover portion taken at the lines 17-17 in FIG. 16.
Figure 18:
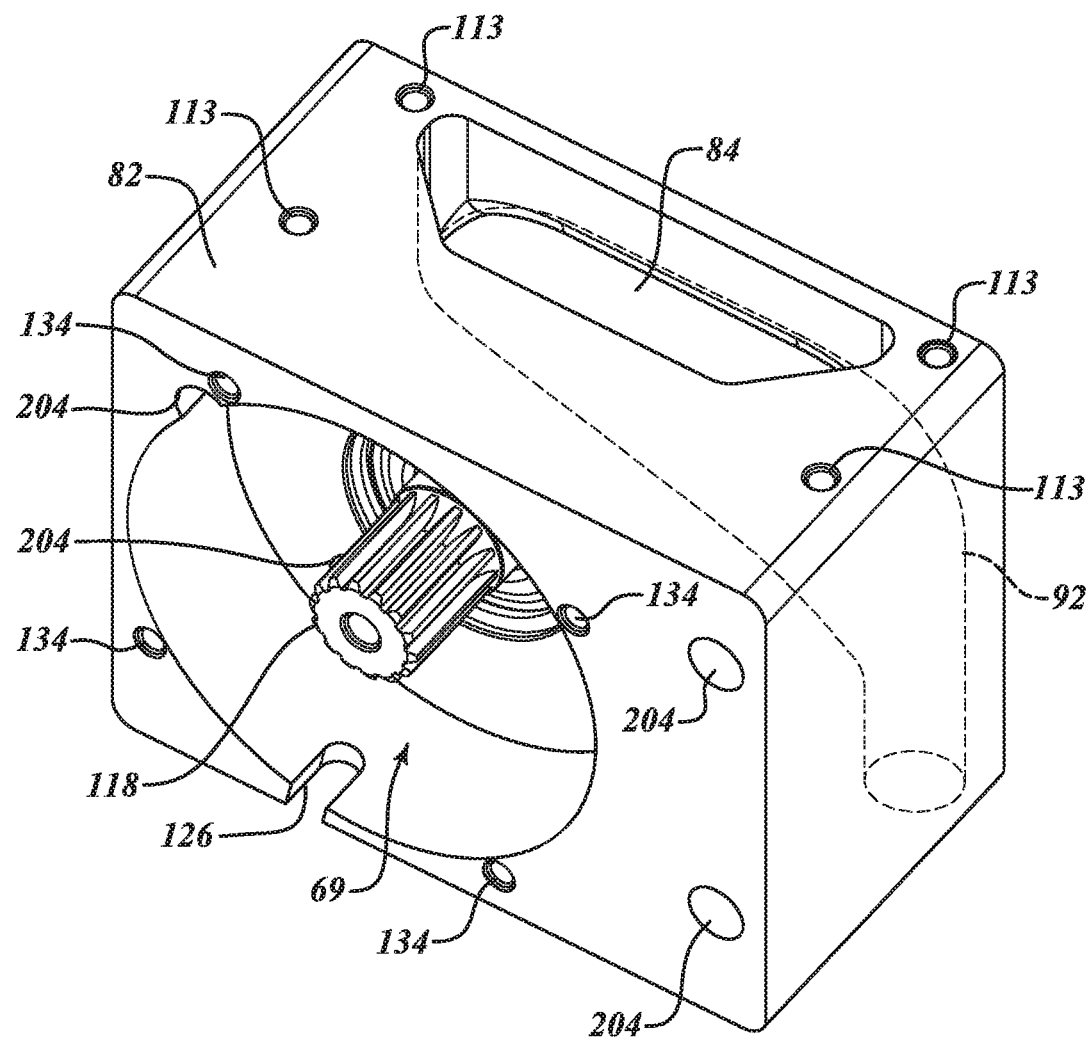
FIG. 18 is a schematic perspective illustration of the inlet cover portion.

FIGS. 16-18 show the inlet cover portion 82 with the toothed end portion 118 of the extension 116 extending into the cavity 69. FIG. 17 shows a bearing 198 supporting the end portion 116 for rotation relative to the inlet cover portion 82. A snap ring 200 holds the bearing in a bore in the inlet cover portion 82. A wave disc spring 202 absorbs axial thrust forces between the bearing 198 and the inlet cover portion 82 keeping the outer race of bearing 198 from spinning in the bore. Stepped openings 204 extend through the inlet cover portion 82 to allow the inlet cover portion 82 to be mounted to the rotor housing portion 90 with fasteners (not shown).

Figure 23:
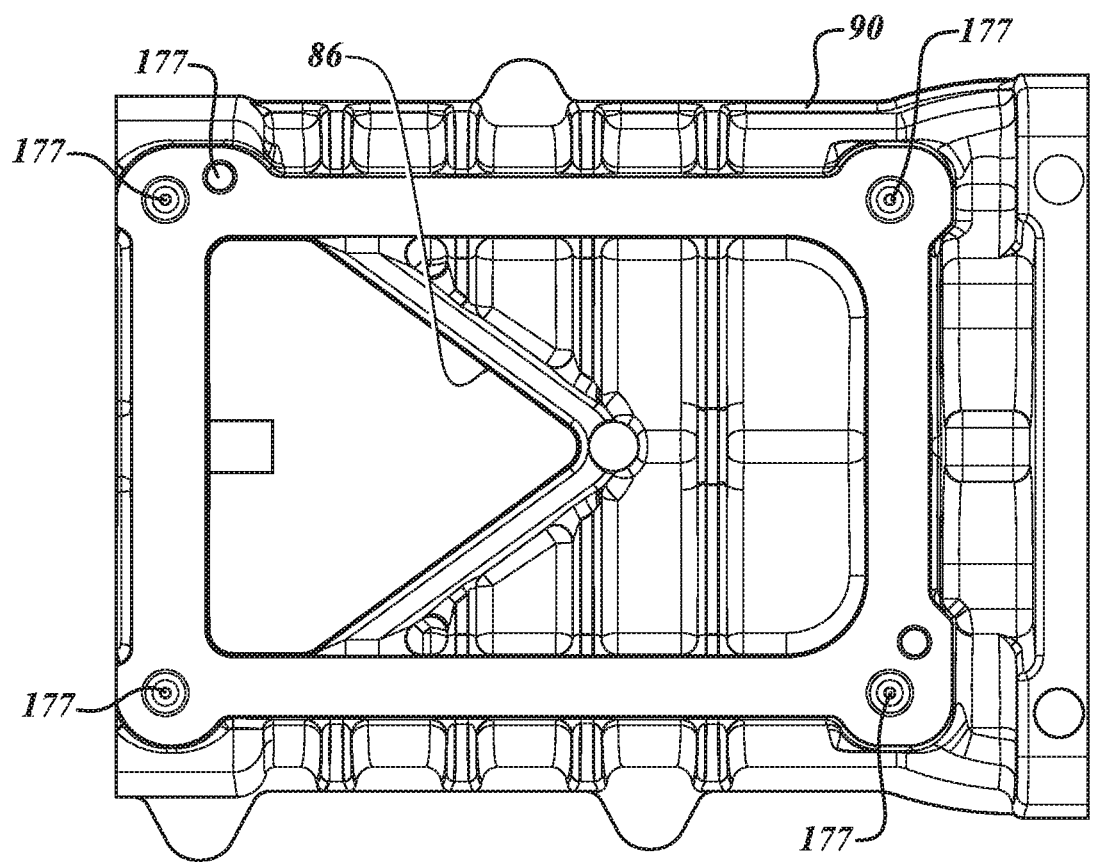
FIG. 23 is a schematic illustration in bottom view of the rotor housing of FIG. 2.
Figure 24:
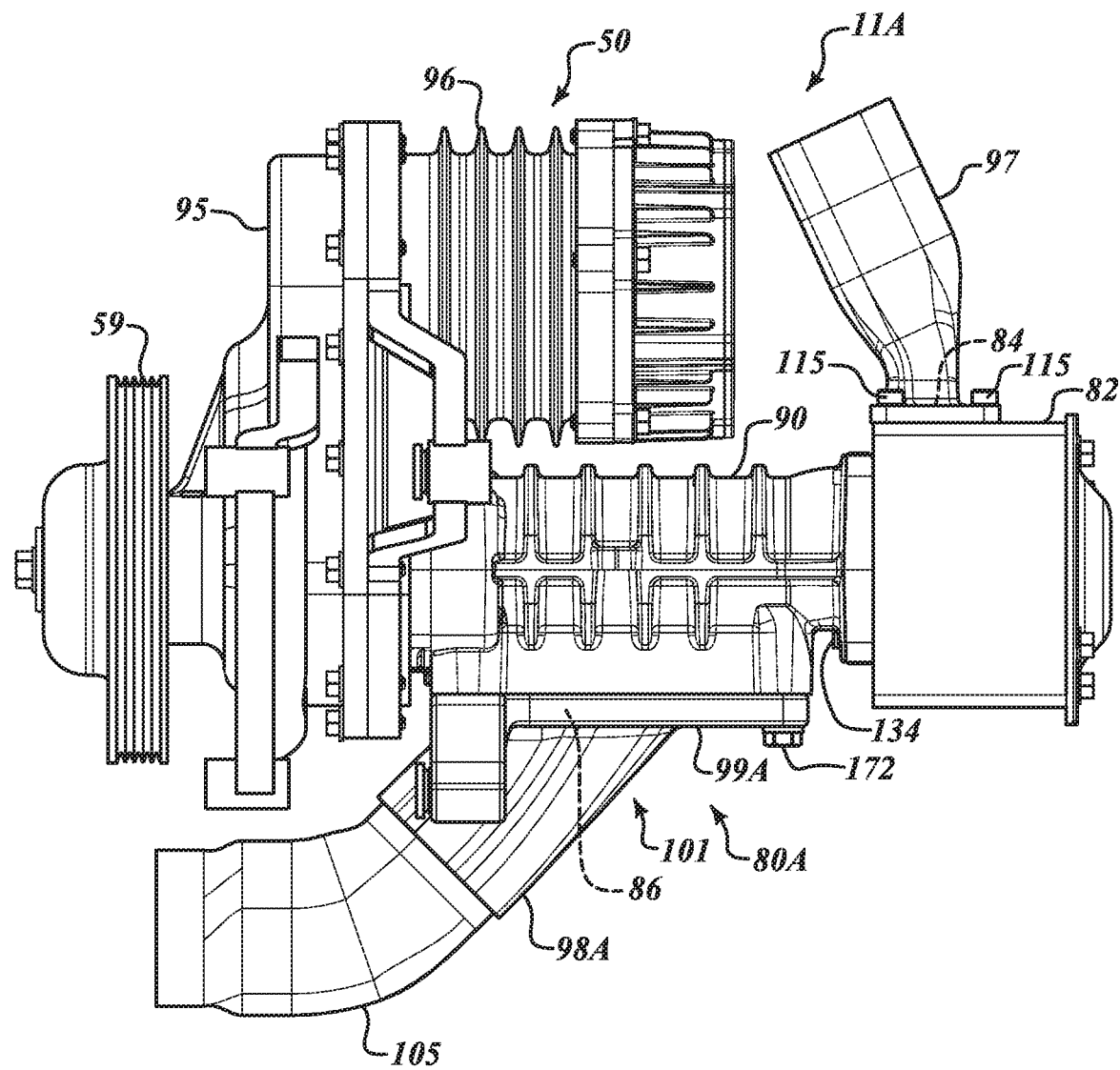
FIG. 24 is a schematic illustration in side view of a supercharger assembly having the outlet component of FIGS. 21 and 22.

FIGS. 21 and 22 show a unitary, one-piece outlet component 101 that includes an outlet housing 99A and an outlet pipe 98A. The outlet component 101 can be used in lieu of the outlet housing 99 and outlet pipe 98, as shown in the supercharger assembly 11A of FIG. 24, which is otherwise identical to supercharger assembly 11. An extension pipe 105 can be welded to the outlet pipe 98A to connect to the throttle body 16. The outlet housing 99A has an opening 103A that is generally shaped like a pentagon. The opening 103A has a tapered, V-shaped end, opposite a wider end. FIG. 23 shows that the air outlet 86 of the rotor housing portion 90 is also generally shaped like a pentagon and is generally the same shape as the opening 103A. The outlet pipe 98A extends from the outlet housing 99A at a 45 degree angle. The generally pentagon shape of the opening 103A as well as the angle at which the outlet pipe extends from the outlet housing 99A provide beneficial air flow characteristics. FIG. 24 shows the supercharger assembly 11A like the supercharger assembly 11 of FIG. 2 except with a housing assembly 80A that includes the outlet component 101 in place of the outlet housing 99 and the outlet pipe 98.

As is apparent in FIGS. 1 and 2, the housing assembly 80 is configured so that the electric motor-generator 50 and the rotor housing portion 90 are on an opposite side of the gear cover portion 95 than the pulley 59. Additionally, the air inlet passage 85 and inlet pipe 97 are adjacent to the electric motor-generator 50 and the air outlet passage 88 and outlet pipe 98 are on an opposite side of the rotor housing portion 90 than the electric motor-generator 50. The housing assembly 80A is arranged in a like manner. It should be appreciated that the throttle body 16 and throttle 14 may be positioned upstream of the inlet pipe 97 in air flow to the engine 13, in which case the supercharger 12 would pull air through the throttle 14 and would be operable to allow the same operating modes discussed herein.

Figure 33:
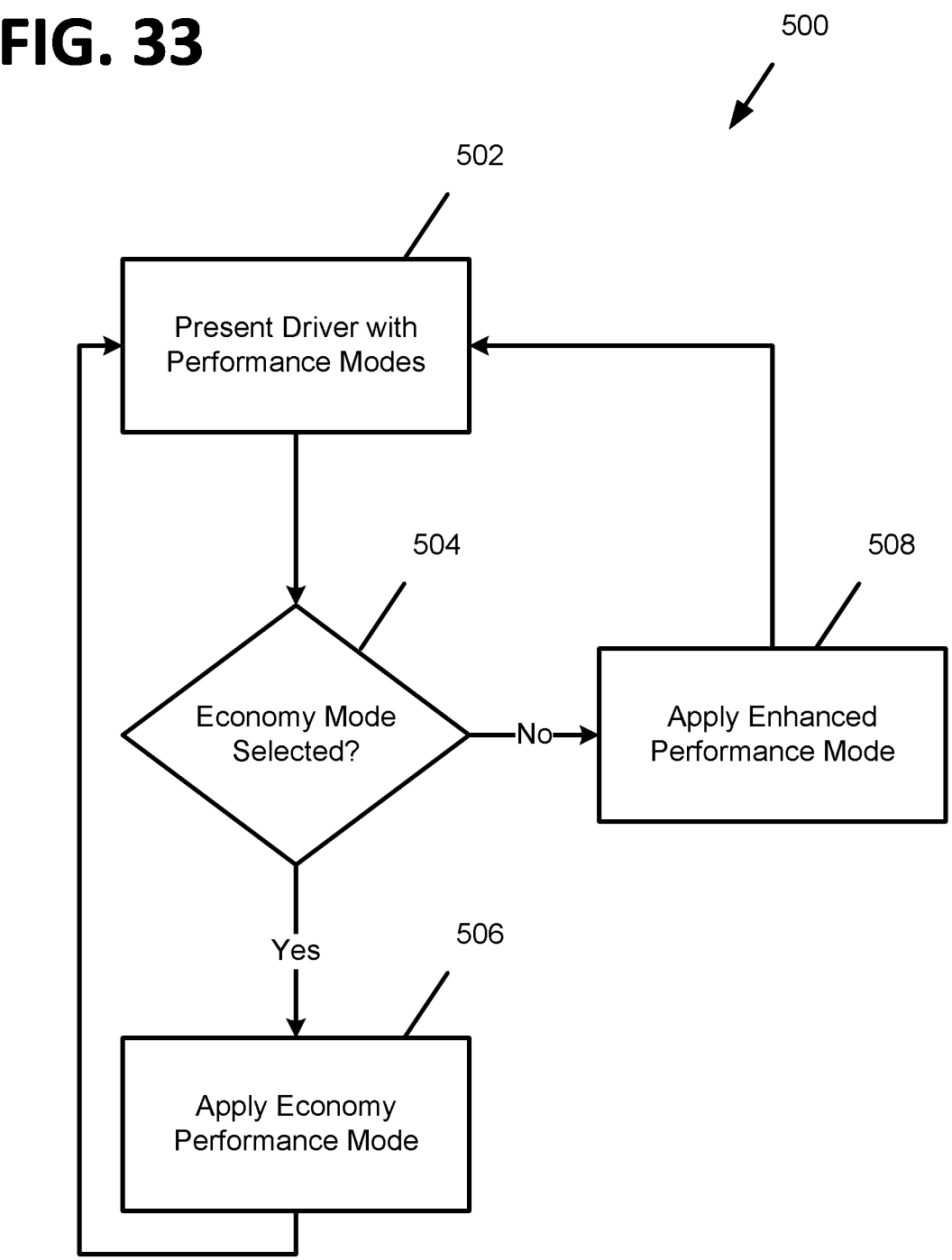
FIG. 33 is a flowchart illustrating an example method for selecting between performance modes.
Figure 34:
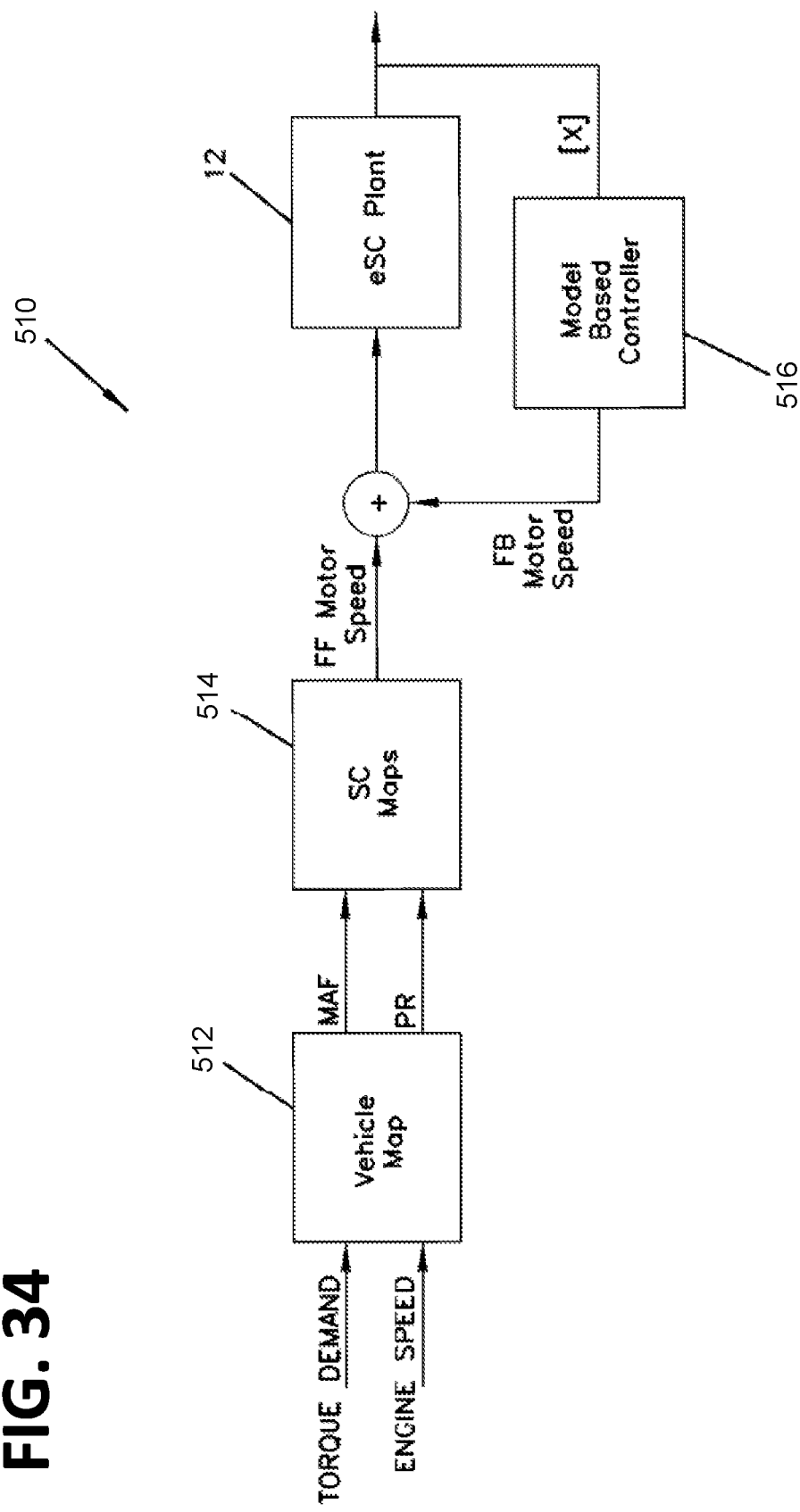
FIG. 34 is a schematic illustration of an example algorithm for boosting.
Figure 35:
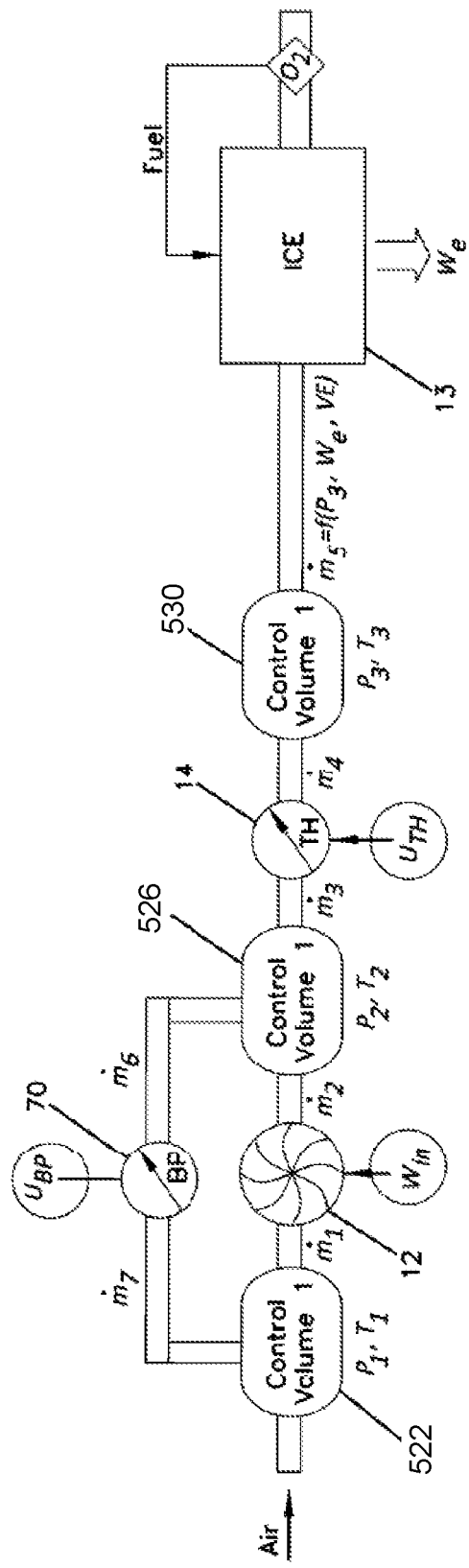
FIG. 35 is a schematic illustration of an example model for boosting according to the algorithm of FIG. 34.

Referring now to FIGS. 33-35, in some examples, the supercharger 12 can be controlled so that the performance of the engine assembly 10/supercharger assembly 11 is modified depending on the operating conditions of the vehicle and/or input from the driver. Specifically, the amount of boost provided by the supercharger 12 can be modified (e.g., by the planetary gearing arrangement 41 and/or the electric motor-generator 50) depending on the handling characteristics desired by the driver.

An example method 500 shown in FIG. 33 allows the user to select between performance modes. In this example, two performance modes are provided, including an economy performance mode and an enhanced performance mode.

Generally, in the economy performance mode, fuel economy is optimized. In this mode, performance of the vehicle may be impacted to enhance the fuel economy. In enhanced performance mode (sometimes referred to as "sports" mode), performance of the vehicle is optimized. In this mode, fuel economy may be impacted to enhance the performance.

Although two performance modes are shown in the illustrated example, more performance modes can be provided. For example, in an alternative example, a "normal" performance mode is provided that falls in between the economy and enhanced performance modes in terms of optimizing fuel economy and performance. Other configurations are possible.

Depending on a performance mode selected by the user and vehicle variables like fuel octane, vehicle loading, ambient temperature and barometric pressure, the supercharger 12 is controlled to adjust the amount of boost. In addition, various operating parameters can be modified, such as transmission shift points, variable valve timing, cam phaser conditions, torque demand, and engine speed, to optimize fuel economy and/or performance according to the selected performance mode. In some examples, depending on the octane rating of a fuel, such operating parameters are modified for optimization.

The method 500 shown in FIG. 33 starts at operation 502, at which the driver is presented with the performance options. For example, one or more buttons can be positioned on the console or instrument cluster of the vehicle that allow the driver to select one of the performance modes. In the absence of a selection (e.g., when the vehicle is first started), the vehicle can default to a specific performance mode (e.g., economy performance mode) and/or automatically select the last performance mode that was used before the vehicle was parked.

Next, at operation 504, the system controller 65 determines which performance mode has been selected by the driver. If the economy performance mode is selected, control is passed to operation 506, and the system controller 65 controls the supercharger 12 in such a manner to enhance the fuel economy of the vehicle. Alternatively, if the enhanced performance mode is selected, control is passed to operation 508, and the system controller 65 controls the supercharger 12 in such a manner to enhance the performance of the vehicle.

Referring now to FIG. 34, an example algorithm 510 for boosting the engine 13 using the supercharger 12 is provided. The algorithm 510 can be implemented, for example, by the system controller 65.

In this example, the algorithm 510 includes both feedforward and feedback loops that allow for the boosting provided by the supercharger 12 to the engine 13 to be modified based upon the selected performance mode.

This is accomplished because the power that is provided to the supercharger 12 can be controlled (as described above). For example, if additional boosting beyond that provided by the power of the engine 13 driving the supercharger 12 is needed, the electric motor-generator 50 is used to provide further power to the supercharger 12 to provide enhanced boosting, such as when the enhanced performance mode is selected. Conversely, if the power provided by the engine 13 exceeds that needed for boosting, the planetary gearing arrangement 41 can be used to reduce the power transferred from the engine 13 to the supercharger 12.

In this example, certain operating parameters are fed into the algorithm. Various operating parameters can be used in the algorithm 510. Examples of the operating parameters fed into the algorithm include transmission shift points, variable valve timing, cam phaser conditions, and the octane rating of a fuel. The operating parameters in this example are torque demand and engine speed. These operating parameters are fed into a vehicle map 512. The vehicle map 512 maps the operating parameters into information that can be used to control the supercharger, as described below. The values in the vehicle map 512 are typically created through testing of a particular vehicle make and model, such as on a dynamometer.

Through this testing, a map is created that takes the operating parameters of torque demand and engine speed and determines a corresponding mass air flow and pressure for each given torque and speed. The mass air flow and pressure from the vehicle map 512 is then fed into supercharger maps 514. The supercharger maps 514, which are specific to each type of supercharger, determine the speed at which the supercharger 12 must be spun to achieve the desired boosting of the engine 13.

The supercharger 12 is then spun at the desired speed to achieve boosting. If that speed differs from the speed provided by the engine 13, the speed of the supercharger 12 can be modified to either increase or decrease the speed at which the supercharger 12 is driven by the engine 13, as described above.

In this example, a feedback loop is also provided to compensate for variations in the supercharger assembly 11 to achieve desired fuel economy and performance, such as variations in the air path dynamics of the supercharger assembly 11.

To accomplish this, a model based controller 516 minimizes a time constant ($\tau$) and a power needed to boost the supercharger ($W_{in}$) according to Equation 1 below.

$$\min(J = k_1 \times \tau k_2 \times W_{in})$$ (Equation 1)

In Equation 1, the time constant $\tau$, which measures the response time of the supercharger 12, is minimized to enhance performance, such as when the enhanced performance mode is selected. Further, the power $W_{in}$ needed for boosting can be minimized to enhance fuel economy, such as when the economy performance mode is selected.

The constants $k_1$ and $k_2$ are weights that are used to select between the performance modes. For example, when the enhanced performance mode is selected by the user, the constant $k_1$ is increased to enhance response time, thereby increasing performance. Conversely, when the economy performance mode is selected, the constant $k_2$ is increased to enhance fuel economy.

The output of the model based controller is feed back into the input to the supercharger 12 to modify performance. In this manner, the actual performance of the supercharger 12 is used to enhance the particular selected performance mode.

Referring now to FIG. 35, a model 520 of a portion of the engine assembly 10 and the supercharger assembly 11 is shown. In this example, control of the throttle 14, bypass valve 70, and engine 13 are manipulated to determine a desired mass flow rate of air through the model 520.

Specifically, the air flow characteristics of volumes 522, 526, 530 along the path from the air intake to the engine 13 are modeled so that Equation 1 can be minimized. To do so, the requested mass air flow ($\dot{m}_R^{air}$) and actual mass air flow ($\dot{m}_A^{air}$) for each torque and speed are compared, and the difference between the two air flows is held within a given tolerance $k_3$ as shown below in Equation 2.

$$\dot{m}_R^{air} - \dot{m}_A^{air} < k_3$$ (Equation 2)

In one example, $k_3$ is set at 0.5 g/s for each torque and speed, although other values can be used.

Using Equation 2, the operating parameters for the vehicle map 512 are calculated for each desired torque and speed. As noted above, the vehicle map 512 is then used as the feedforward input to determine the mass air flow and pressure characteristics to minimize Equation 1 at the desired performance mode.

The reference numbers used in the drawings and the specification along with the corresponding components are as follows:
10 engine assembly
11 supercharger assembly
11A supercharger assembly
12 supercharger
13 engine
14 throttle 14A fully open position of throttle
16 throttle body
18 plenum
20 intake manifold
21 drive axle
22 transmission
24 set of rotors
26 first rotor
28 second rotor
30 first shaft
31 first set of plates
32 second shaft
33 second set of plates
34 first gear
35 clutch housing
36 second gear
37 spring
38 apply plate
39 coil
41 planetary gearing arrangement
42 sun gear member
44 ring gear member
46 carrier member
47 pinion gears
48 crankshaft
49 belt drive
50 electric motor-generator
52 motor shaft
53 first gear member
54 second gear member
55 clutch
56 shaft
57 pulley
58 semi-flexible coupling member
59 pulley
61 pulley shaft
62 motor controller
63 belt
64 energy storage device
65 system controller
66 power cables
68 brake
69 cavity
70 bypass valve
70A fully open position of bypass valve
76 pulley
79 shaft
78 vehicle accessories
80 stationary housing assembly
80A stationary housing assembly
82 inlet cover portion
84 air inlet of inlet cover portion
84A air inlet opening of rotor housing portion
85 air inlet passage
86 air outlet
88 air outlet passage
90 rotor housing portion
92 portion of bypass passage
94 bypass passage
95 gear cover portion
96 motor housing portion
97 inlet pipe
98 outlet pipe
98A outlet pipe
99 outlet housing
99A outlet housing
100 oil slinger
101 outlet component
102 first end of oil slinger
103 opening of outlet housing 99
103A opening of outlet housing 99A
104 first inner diameter
105 extension pipe
106 second end of oil slinger
108 scooped portion
110 opening
112 inner surface of scooped portions
113 opening of inlet cover portion
114 inner surface of oil slinger
115 fastener
116 extension portion of first shaft
118 toothed end portion
120 rotating member
122 flange
124 bearing
126 wire access opening
128 coil
130 brake cover
132 fastener
134 opening
135 fastener
140 opening of motor housing portion
142 first member of coupling
144 flange of shaft 56
146 pin
148 seal on first shaft
150 fastener openings on gear cover portion
151 opening
152 fastener opening in motor cover portion
154 mounting flange
156 fastener opening
157 fasteners
158 hex screw
160A bearing
160B bearing
161 washer
162 passage
164 seal
166A wave disc spring
166B wave disc spring
166C disc spring
166D disc spring
167A ribs
167B ribs
167C ribs
168A needle bearing
168B needle bearing
169 recess
170 fastener opening
172 fastener
173 flange
174 opening
176 outlet of outlet pipe
177 fastener opening
180 mounting flange
182 opening
185 seal
186 opening
188 needle bearing
190 opening
192 stepped opening
193 opening
194 motor controller housing
196 cooling fins 198 bearing
200 snap ring
202 wave disc spring
204 stepped openings
300 method for regeneration
302 operation of the method
304 operation of the method
306 operation of the method
310 throttling loss regeneration mode
320 supercharger locked regeneration mode
330 supercharger unlocked regeneration mode
340 pumping regeneration mode
350 engine regeneration mode
400 method for determining reference state of charge
402 operation of the method
404 operation of the method
406 operation of the method
408 operation of the method
410 operation of the method
412 operation of the method
414 operation of the method
420 graph of speed vs. time
430 graph of state of charge vs. time
500 method for selecting performance mode
502 operation of the method
504 operation of the method
506 operation of the method
508 operation of the method
510 algorithm for boosting
512 vehicle map
514 supercharger map
516 model based controller
520 model of a portion of engine assembly and supercharger assembly
522 volume
526 volume
530 volume
A direction of oil The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A supercharger assembly for an engine, the supercharger assembly comprising:
   a supercharger configured to provide boost to the engine;
   an electric motor coupled to the supercharger; and
   a planetary gearing arrangement coupled between the engine and the electric motor, the planetary gearing arrangement including a sun gear coupled with the supercharger, a ring gear coupled with the motor, and a plurality of planet gears coupled with the internal combustion engine and being configured to:
   increase power transferred to the supercharger by the engine using the electric motor to increase the boost to the engine, wherein power from the electric motor and the internal combustion engine is transferred to the sun gear associated with the supercharger via the planet and ring gears; and
   decrease power transferred to the supercharger by the engine to decrease the speed of the supercharger to decrease the boost to the engine,
   wherein the boost provided by the supercharger to the engine is controlled based upon a performance mode selected by a driver.

2. The supercharger assembly of claim 1, wherein the performance mode includes one of an economy performance mode and an enhanced performance mode.

3. The supercharger assembly of claim 2, wherein the boost is increased in the enhanced performance mode.

4. The supercharger assembly of claim 3, wherein the electric motor drives the supercharger to increase the boost.

5. The supercharger assembly of claim 2, wherein the boost is decreased in the economy performance mode.

6. The supercharger assembly of claim 5, wherein the planetary gearing arrangement decreases the power transferred to the supercharger by the engine.

7. The supercharger assembly of claim 2, wherein a mapping is used to correlate a desired torque of the engine and speed of the engine to a characteristic of the supercharger.

8. The supercharger assembly of claim 7, wherein the characteristic includes mass air flow of the supercharger.

9. The supercharger assembly of claim 1, further comprising a brake operable to stop rotation of the sun gear.

10. A method for boosting an engine using a supercharger assembly operably connected to the engine and a motor via a planetary gear set including a sun gear coupled with the supercharger, a ring gear coupled with the motor, and a plurality of planet gears coupled with the engine, the method comprising:
    receiving a selection of a performance mode;
    when an enhanced performance mode is selected, increasing a speed of the supercharger to greater than that provided by the power of the engine; and
    when an economy performance mode is selected, decreasing the speed of the supercharger to less than that provided by the power of the engine.

11. The method of claim 10, wherein the increasing of the speed of the supercharger further comprises using an electric motor to increase the speed.

12. The method of claim 10, wherein the decreasing of the speed of the supercharger further comprises using a gearing system to decrease the speed.

13. The method of claim 10, further comprising mapping a desired torque of the engine and speed of the engine to a mass air flow of the supercharger and pressure of the supercharger to control an input to the supercharger.

14. The method of claim 13, further comprising providing feedback to manipulate the input to the supercharger.

15. The method of claim 13, further comprising determining a difference between a requested air flow of the supercharger and an actual air flow of the supercharger to provide the mapping.

16. The method of claim 15, further comprising controlling a bypass valve and a throttle to create the requested air flow.

17. A method for boosting an engine using a supercharger assembly operably connected to the engine and a motor via a planetary gear set including a sun gear coupled with the supercharger, a ring gear coupled with the motor, and a plurality of planet gears coupled with the engine, the method comprising:
    receiving a selection between an economy performance mode and an enhanced performance mode;
    when an enhanced performance mode is selected, increasing a speed of the supercharger using an electric motor to greater than that provided by the power of the engine; and when an economy performance mode is selected, decreasing the speed of the supercharger to less than that provided by the power of the engine.

18. The method of claim 17, wherein the decreasing of the speed of the supercharger further comprises using a gearing system to decrease the speed.

19. The method of claim 17, further comprising mapping a desired torque of the engine and speed of the engine to a mass air flow of the supercharger and pressure of the supercharger to control an input to the supercharger.

20. The method of claim 19, further comprising:
determining a difference between a requested air flow of the supercharger and an actual air flow of the supercharger to provide the mapping; and
controlling a bypass valve and a throttle to create the requested air flow.

* * * * *